US010069692B2

(12) United States Patent
Jeon et al.

(10) Patent No.: US 10,069,692 B2
(45) Date of Patent: Sep. 4, 2018

(54) ELECTRONIC DEVICE AND METHOD FOR PROVIDING INFORMATION THEREOF

(71) Applicant: Samsung Electronics Co., Ltd, Gyeonggi-do (KR)

(72) Inventors: Yongjoon Jeon, Gyeonggi-do (KR); Junghun Kim, Gyeonggi-do (KR); Jihyun Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/349,993

(22) Filed: Nov. 11, 2016

(65) Prior Publication Data

US 2017/0134567 A1    May 11, 2017

(30) Foreign Application Priority Data

Nov. 11, 2015 (KR) .......................... 10-2015-0158255

(51) Int. Cl.
*H04B 1/38* (2015.01)
*H04L 12/24* (2006.01)
*H04M 1/725* (2006.01)
*H04M 1/2745* (2006.01)
*H04M 1/60* (2006.01)

(52) U.S. Cl.
CPC ........ *H04L 41/22* (2013.01); *H04M 1/72569* (2013.01); *H04M 1/274516* (2013.01); *H04M 1/6075* (2013.01)

(58) Field of Classification Search
CPC .......... H04M 1/72569; H04M 1/72583; H04L 41/22
See application file for complete search history.

(56) References Cited

U.S. PATENT DOCUMENTS

| | | | |
|---|---|---|---|
| 8,160,622 B2* | 4/2012 | Himeno | H04M 1/72552 455/130 |
| 2009/0209298 A1* | 8/2009 | Abeta | H04M 1/575 455/569.2 |
| 2010/0004033 A1* | 1/2010 | Choe | G06F 1/1626 455/567 |
| 2010/0029260 A1 | 2/2010 | Kim et al. | |
| 2016/0295515 A1* | 10/2016 | Cai | H04W 52/0261 |
| 2017/0127190 A1* | 5/2017 | Gudiksen | H04R 25/558 |

FOREIGN PATENT DOCUMENTS

| | | |
|---|---|---|
| KR | 20100013572 | 2/2010 |
| KR | 101252281 B1 | 4/2013 |
| KR | 20140141860 | 12/2014 |

* cited by examiner

*Primary Examiner* — Tuan Pham

(57) ABSTRACT

Various embodiments relate to an electronic device and method for providing information. The electronic device receives status information of an external device and then displays a combination of the received status information and stored user information, e.g., phonebook, of the external device. The external device creates or updates the status information thereof and delivers the created or updated status information to the electronic device. The electronic device displays the received status information of the external device on a specific region.

16 Claims, 32 Drawing Sheets

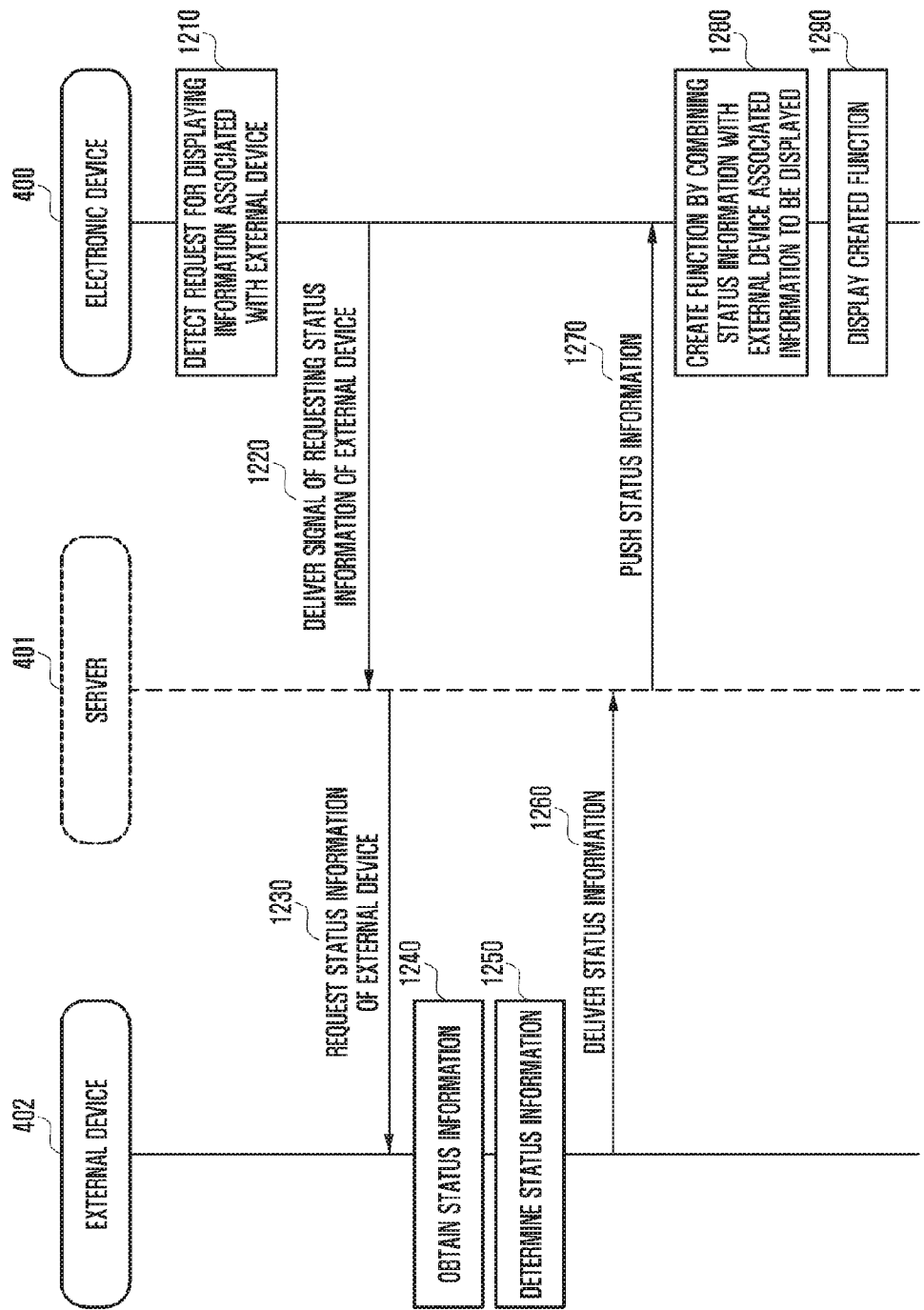

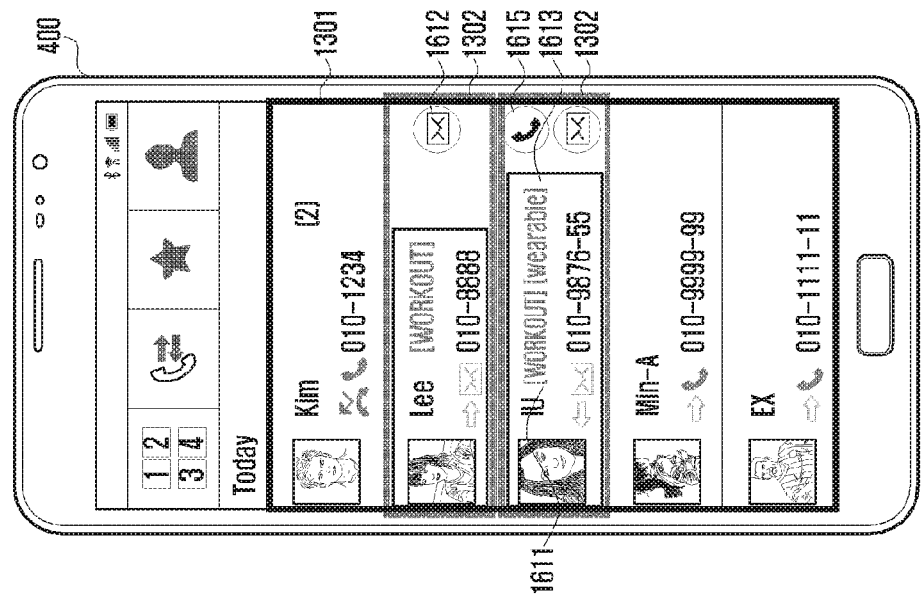
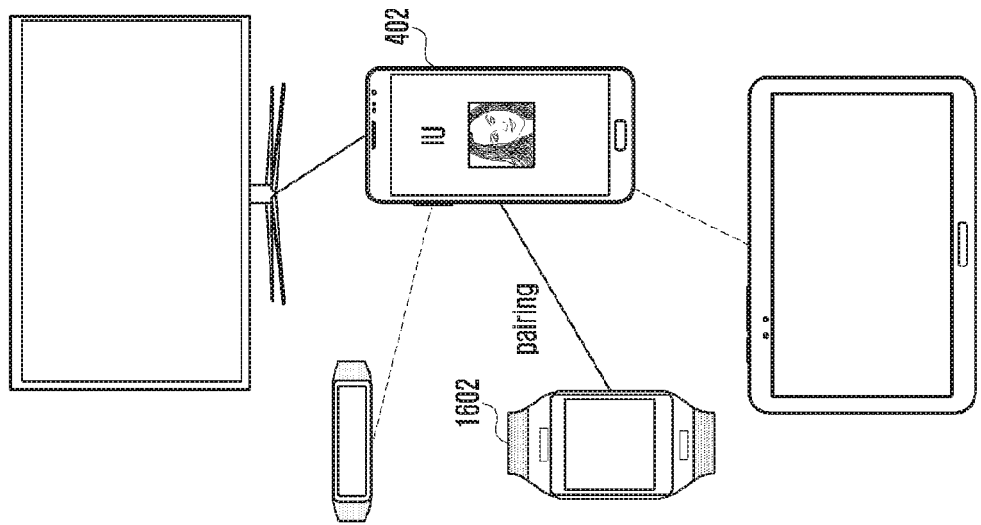
FIG. 16

FIG. 17
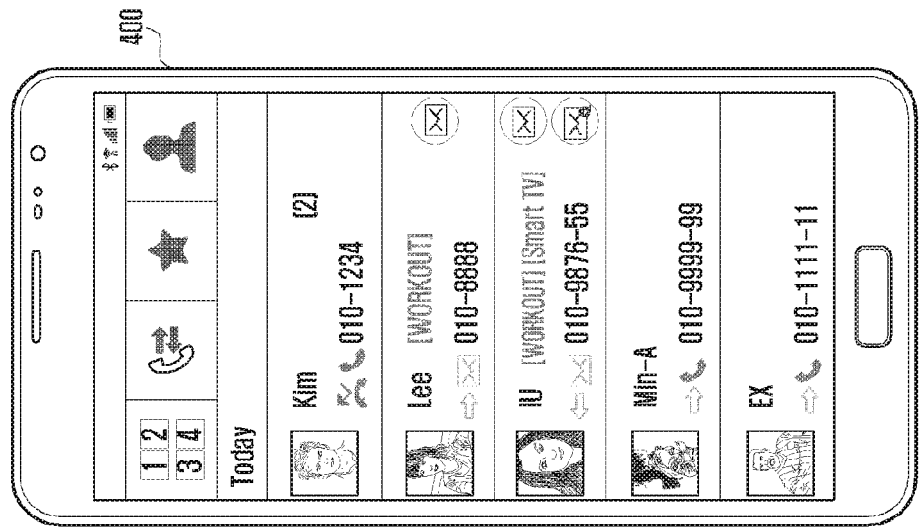
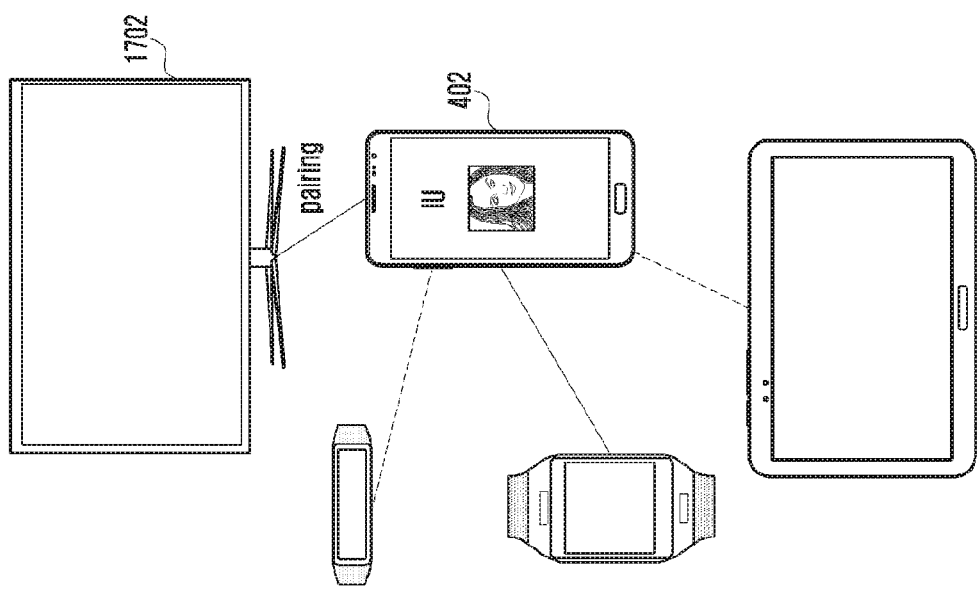

FIG. 19
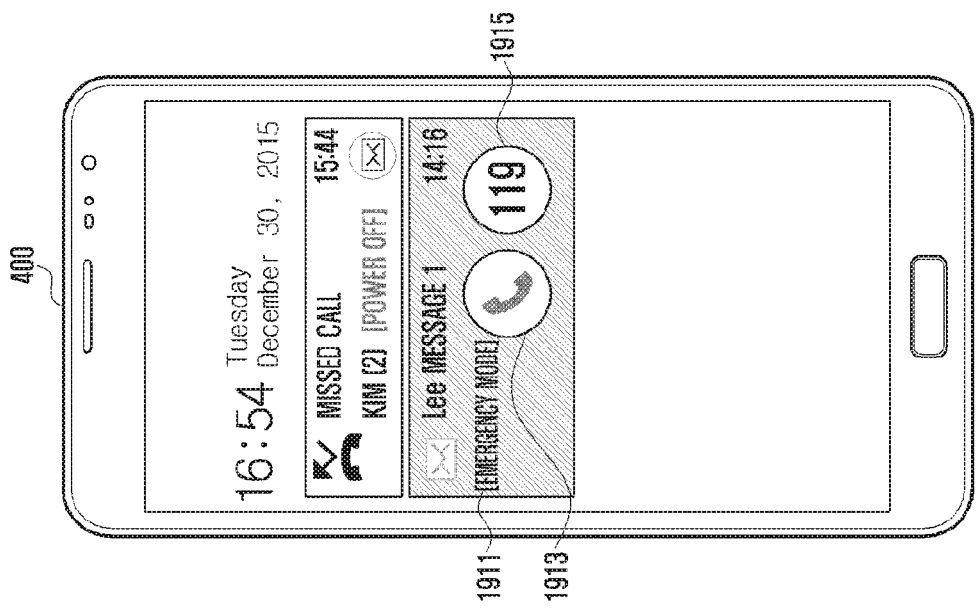
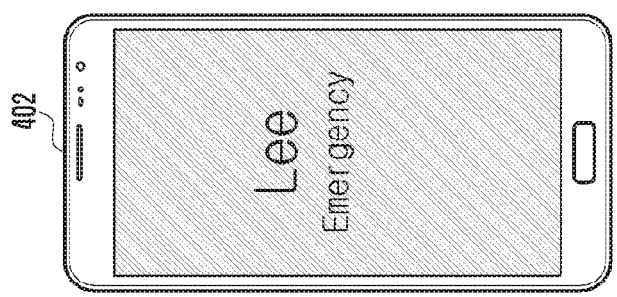

US 10,069,692 B2

ELECTRONIC DEVICE AND METHOD FOR PROVIDING INFORMATION THEREOF

CROSS-REFERENCE TO RELATED APPLICATION(S) AND CLAIM OF PRIORITY

The present application is related to and claims benefit under 35 U.S.C. § 119(a) of Korean Patent Application filed on Nov. 11, 2015 in the Korean Intellectual Property Office and assigned Serial Number 10-2015-0158255, the entire disclosure of which is hereby incorporated by reference.

TECHNICAL FIELD

Embodiments disclosed herein relate to an electronic device for displaying information associated with an external device and also to a method for providing such information.

BACKGROUND

With the growth of related technologies, a great variety of electronic devices are developed rapidly and used widely in various fields. Normally, a typical electronic device may offer user status information to any other external device through a message.

By the way, in order to initially set or update this type information, the typical electronic device requires a user to enter a suitable menu of a corresponding application and then directly perform an input action.

Unfortunately, this manual process may often cause much inconvenience to a user.

SUMMARY

To address the above-discussed deficiencies, it is a primary object to provide an electronic device may comprise a communication circuit; a display; a processor electrically connected with the communication circuit and the display; and a memory electrically connected with the processor. In this electronic device, the memory may store information about contacts associated with a plurality of external devices capable of communicating with the electronic device. Additionally, the memory may store instructions that cause, when executed, the processor to: receive status information of a first external device among the plurality of external devices from an external entity through the communication circuit, retrieve at least part of the information about contacts stored in the memory, display information about contact associated with the first external device on a first region of the display, based on the retrieved information, and simultaneously display the received status information of the first external device near or within the first region.

According to various embodiments of the present disclosure, an electronic device may comprise a communication circuit configured for a wireless communication with a first external device; a touch screen display; a processor electrically connected with the communication circuit and the display; and a memory electrically connected with the processor. In this electronic device, the memory may store instructions that cause, when executed, the processor to: display, on the display, a user interface including contact information of other user associated with the first external device in response to an input received through the display, receive present or immediately previous status information of the first external device through the communication circuit, and display an item indicating the received status information as part of or near the contact information in the user interface.

According to various embodiments of the present disclosure, a method for providing information to an electronic device may comprise operations of: at an external device, detecting changed status information; at the external device, updating status information about an up-to-date status by analyzing the changed status information; and at the external device, delivering the updated status information to the electronic device.

According to various embodiments of the present disclosure, a method for providing information at an electronic device may comprise operations of: receiving status information of an external device; checking stored user information of the external device; and displaying, on a first region of a display, particular information created by combining the received status information with the stored user information.

According to various embodiments of the present disclosure, the electronic device that receives the status information of the external device may display a combination of the received status information and stored user information of the external device, thus improving the usability of the electronic device.

In addition, according to various embodiments of the present disclosure, the electronic device that receives the status information of the external device may dynamically and suitably display the received status information on various screen or pages.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 is a flow diagram illustrating a process of requesting and receiving status information of an external device according to various embodiments of the present disclosure.

FIG. 16 is a diagram illustrating an example of displaying status information of an interacting device such as a wearable device through connectivity information according to various embodiments of the present disclosure.

FIG. 17 is a diagram illustrating an example of displaying status information of an interacting device such as a smart TV according to various embodiments of the present disclosure.

FIG. 19 is a diagram illustrating status information of an external device indicating an emergency case according to various embodiments of the present disclosure.

DETAILED DESCRIPTION

Figure 1:
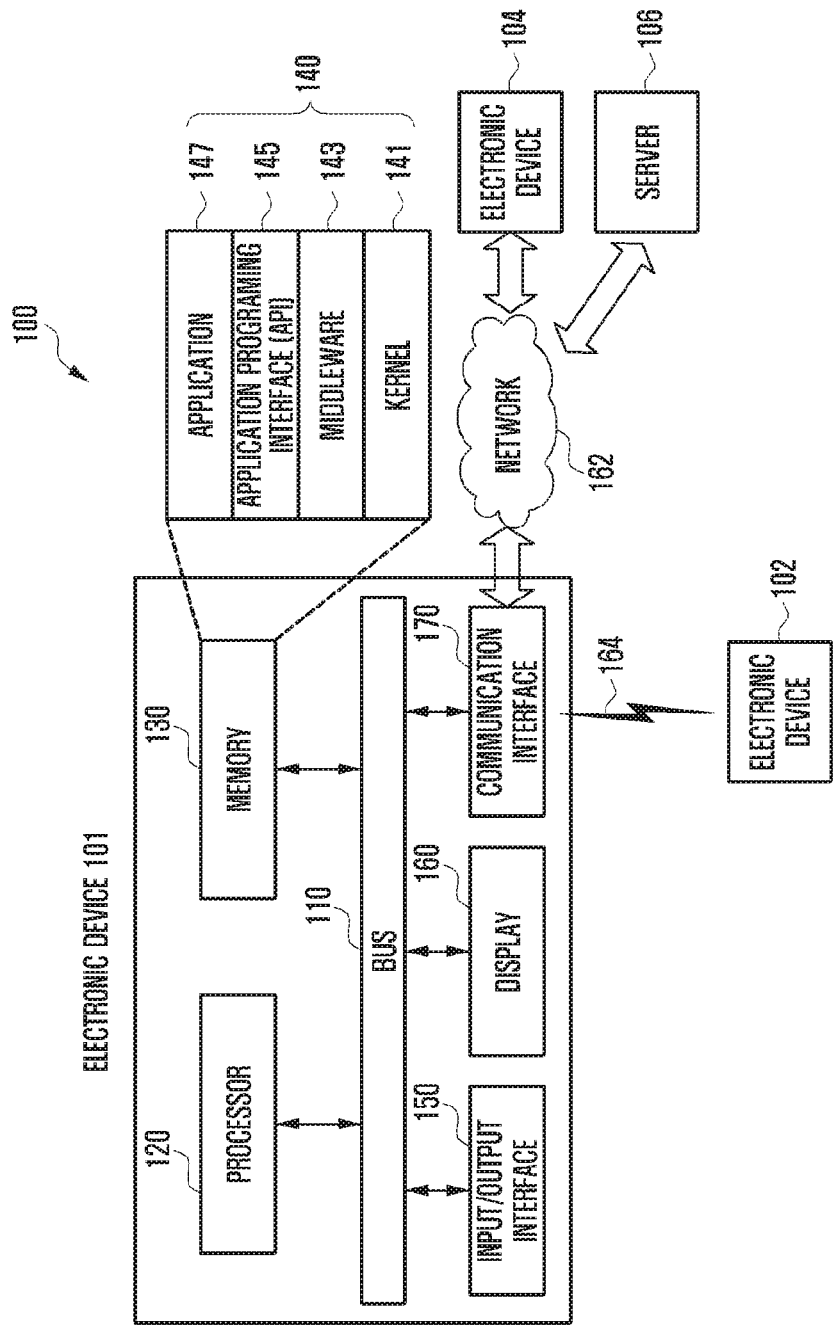
FIG. 1 is a block diagram illustrating a network environment including an electronic device according to various embodiments of the present disclosure.

FIGS. 1 through 20B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

An electronic device according to various embodiments of the present disclosure may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HIVID), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the present disclosure may also be a combination of the devices listed above. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

The definition of "canvas" in the present disclosure is a drawing board in an electronic device for drawing pictures. When there is a plurality of electronic devices that is being drawn on simultaneously, the screen displayed on each electronic device can be the same canvas. That is, when a plurality of electronic devices is being drawn on simultaneously, the same picture can be displayed on each of the electronic devices.

The definition of "drawing application" in the present disclosure is any application with which a picture can be drawn in response to a user input on an electronic device. For example, drawing applications include all applications in which an image can be drawn in response to an input point of an user input.

FIG. 1 illustrates a network environment 100 including an electronic device 101 according to various embodiments of the present disclosure. The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components.

The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., a first external electronic device 102, a second external electronic device 104, or a server 106). For example, the communication interface 170 is capable of communicating with an external device (e.g., a second external electronic device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
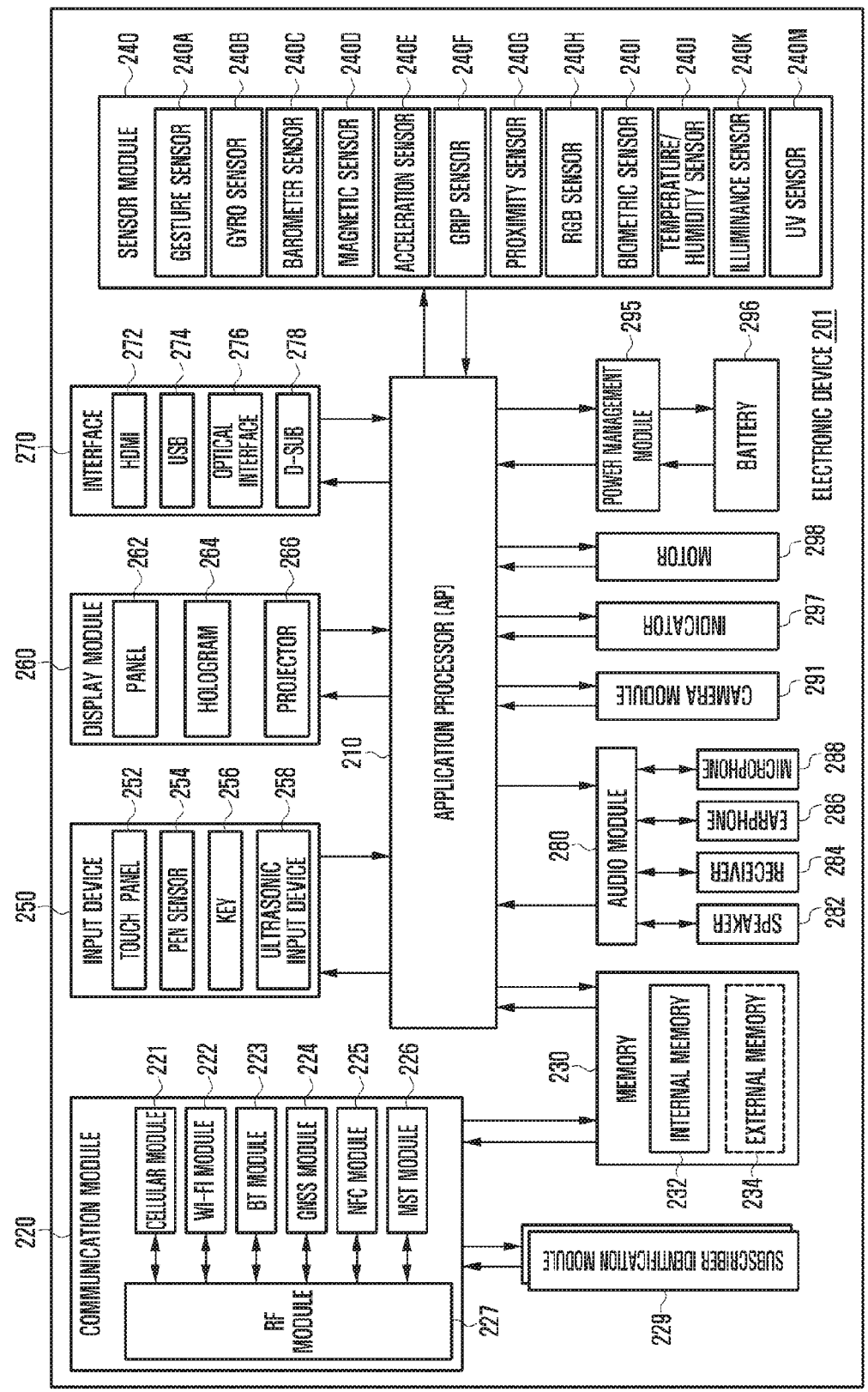
FIG. 2 is a block diagram illustrating an electronic device according to various embodiments of the present disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 229, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 220 is capable of including a cellular module 221, WiFi module 222, Bluetooth (BT) module 223, GNSS module 224 (e.g., a GPS module, Glonass module, Beidou module or Galileo module), NFC module 225, MST (Magnetic Secure Transmission) module 226, and Radio Frequency (RF) module 227.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 229 (e.g., a SIM card). According to an embodiment, the cellular module 221 is capable of performing at least part of the functions provided by the processor 210. According to an embodiment, the cellular module 221 is also capable of including a communication processor (CP).

Each of the WiFi module 222, the BT module 223, the GNSS module 224, and the NFC module 225, and MST module 226 is capable of including a processor for processing data transmitted or received through the corresponding module. According to embodiments, at least part of the cellular module 221, WiFi module 222, BT module 223, GNSS module 224, and NFC module 225 (e.g., two or more modules), and MST module 226 may be included in one integrated chip (IC) or one IC package.

The RF module 227 is capable of transmission/reception of communication signals, e.g., RF signals. The RF module 227 is capable of including a transceiver, a power amp module (PAM), a frequency filter, a low noise amplifier (LNA), an antenna, etc. According to another embodiment, at least one of the following modules: cellular module 221, WiFi module 222, BT module 223, GNSS module 224, and NFC module 225, and MST module 226 is capable of transmission/reception of RF signals through a separate RF module.

The SIM 229 is capable of including a card including a subscriber identification module (SIM) and/or an embodied SIM. The SIM 229 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
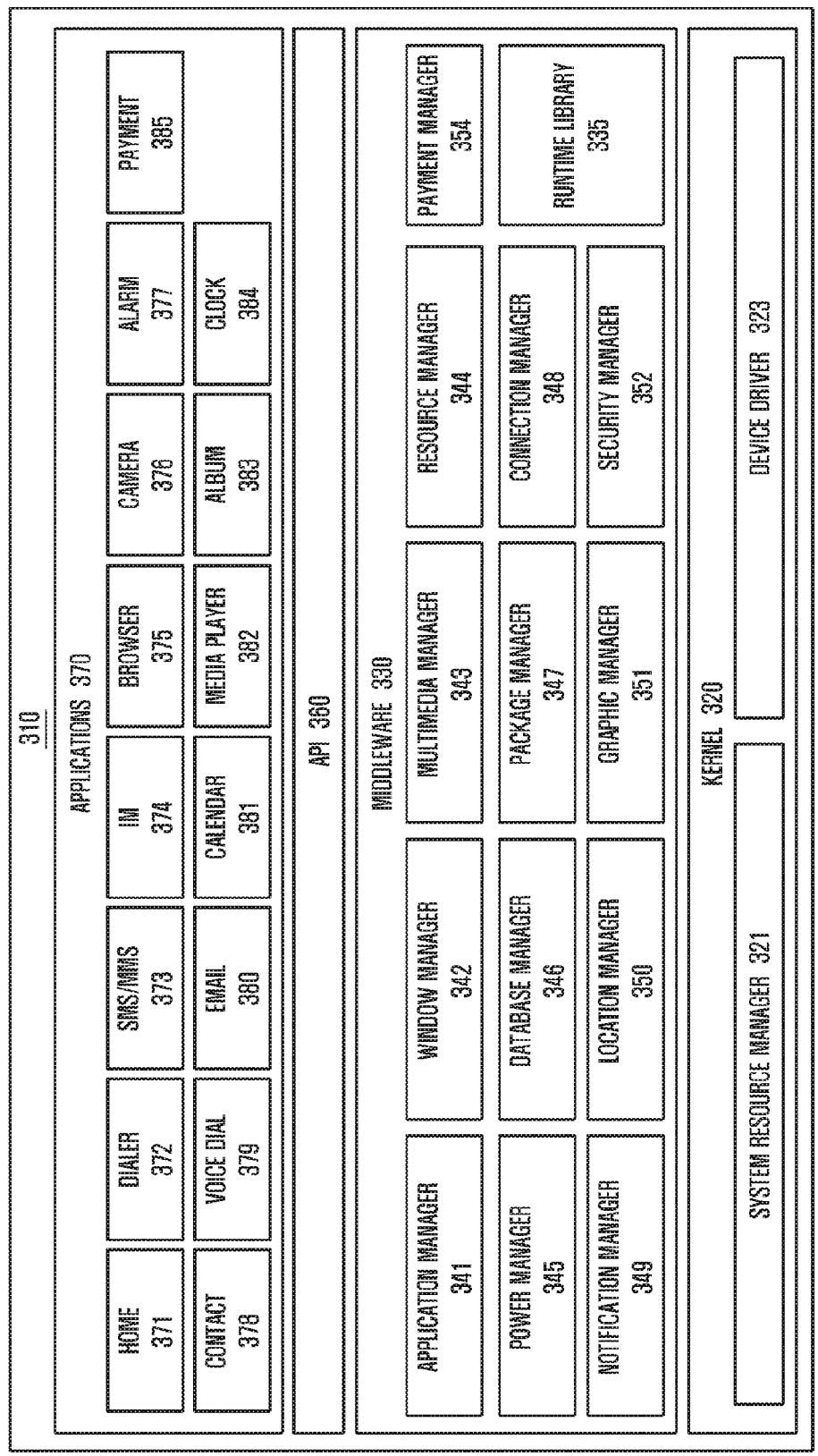
FIG. 3 is a block diagram illustrating a program module according to various embodiments of the present disclosure.

FIG. 3 is a block diagram of a programming module according to various embodiments. According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and a payment manager 354.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

In this disclosure, the term 'status information' refers to information about a current status of an electronic device. The status information may be technically referred to as 'presence' in the art. Additionally, in this disclosure, two terms, an electronic device and an external device, will be used together even though they may be the same kind of devices. The electronic device and the external device are merely distinguished from each other by users thereof.

Figure 4:
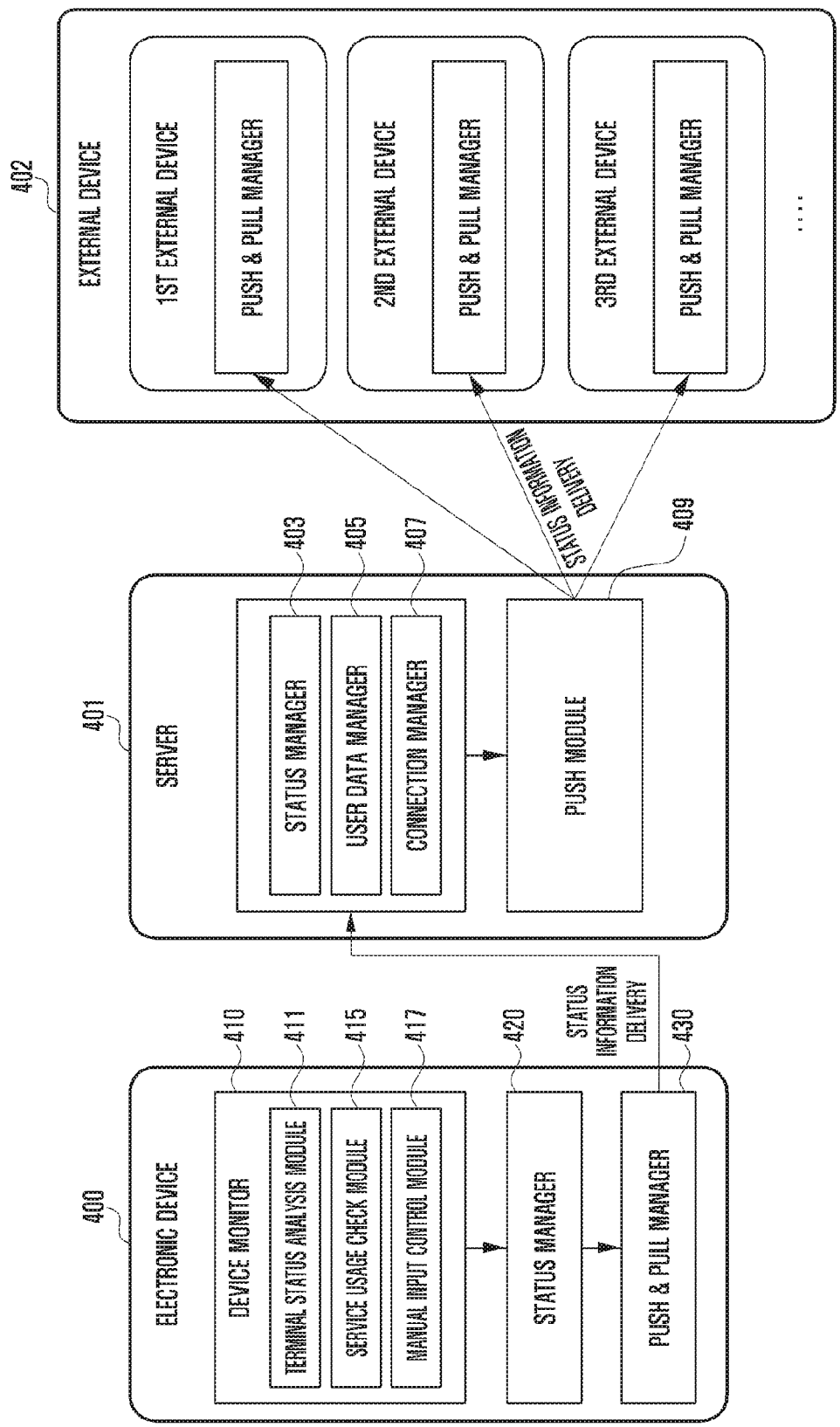
FIG. 4 is a diagram illustrating a system configuration applied to various embodiments of the present disclosure.
Figure 5:
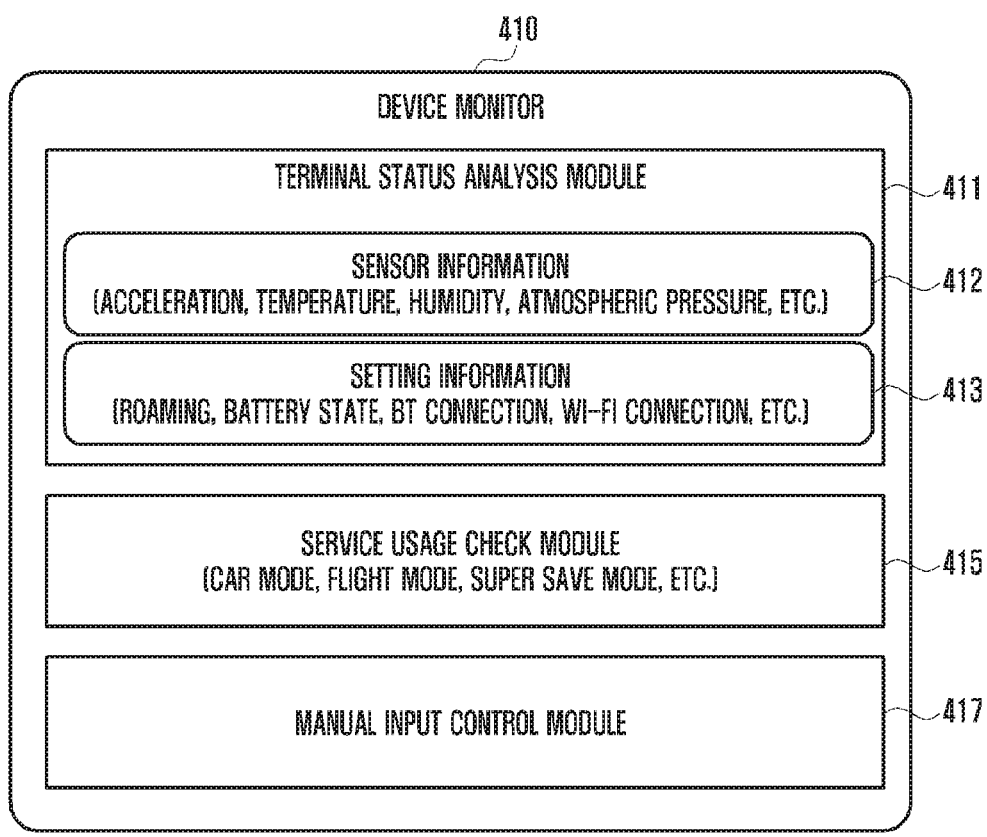
FIG. 5 is a diagram illustrating a configuration of a device monitor of an electronic device according to various embodiments of the present disclosure.

FIG. 4 is a diagram illustrating a system configuration applied to various embodiments of the present disclosure, and FIG. 5 is a diagram illustrating a configuration of a device monitor of an electronic device according to various embodiments of the present disclosure.

As shown in FIG. 4, the system applied to this disclosure may include an electronic device 400, a server 401, and an external device 402.

According to various embodiments, the electronic device 400 may transmit or receive data, such as call data, message data, or messenger data, to or from the external device 402. The electronic device 400 may store user information such as, e.g., a phone number of a user of the external device 402 and display such information through a phonebook. Additionally, the electronic device 400 may receive status information of the external device 402 and offer the status information to a user thereof. Also, the electronic device 400 may offer status information thereof to a user of the external device 402.

According to various embodiments, the server 401 may store the user information and status information of the external device 402, check a connection status of the external device 402, and then offer the stored status information to the electronic device 400. In response to a request from a user of the electronic device 400, the server 401 may obtain and update the status information of the external device 402, store the obtained and updated status information, and offer the stored information to the electronic device 400. The server 401 may include a status manager 403, a user data manager 405, a connection manager 407, and a push module 409. The status manager 403 may manage the status information of each of the electronic device 400 and/or the external device 402, depending on users. The user data manager 405 may manage personal information of each user of the electronic device 400 and/or the external device 402 stored in a storage of the server 401. The connection manager 407 may manage information about friends connected to each user of the electronic device 400 and/or the external device 402. The push module 409 may perform a function for transmitting the status information from the server 401 to the electronic device 400 and/or the external device 402 in a push or pull manner.

According to various embodiments, the external device 402 may store user information such as, e.g., a phone number of a user of the electronic device 400, display such information through a phonebook, and transmit the status information in response to a request of the electronic device 400. Namely, the external device 402 may offer the status information thereof to a user of the electronic device 400. The external device 402 may have the same configuration as the electronic device 400 has. The external device 402 may include a plurality of devices (i.e., the first external device, the second external device, the third external device, etc.) each of which is used by other user who is different from a user of the electronic device 400. The external device 402 may be the same kind of electronic device as that of the electronic device 400. The external device 402 may include at least one of various kinds of devices, such as a wearable device, a watch-type device, a smart TV, and a robot, which have the ability to interact with the electronic device 400.

According to various embodiments, the electronic device 400, the server 401 and the external device 402 may exchange related information with each other through a network (not shown). This network may support a wired or wireless communication among the electronic device 400, the server 401 and the external device 402. The network may include at least one of a telecommunication network, a computer network (e.g., LAN or WAN), the internet, or a telephone network.

Meanwhile, as shown in FIG. 4, the electronic device 400 may include a device monitor 410, a status manager 420, and a push & pull manager 430.

According to various embodiments, the device monitor 410, which is configured to monitor the status information of the electronic device 400, may include a terminal status analysis module 411, a service usage check module 415, and a manual input control module 417. As shown in FIG. 5, the terminal status analysis module 411 may have sensor information 412 (e.g., acceleration, temperature, humidity, atmospheric pressure, etc.) and setting information 413 (e.g., roaming, a battery state, a Bluetooth (BT) connection, a Wi-Fi connection, etc.) of the electronic device 400. Based on this information, the terminal status analysis module 411 may analyze automatically the status of the electronic device 400. The service usage check module 415 may monitor and analyze information (e.g., a car mode, a flight mode, a super save mode, etc.) which is set or controlled by a user of the electronic device 400. The manual input control module 417 may offer a function for allowing a user of the electronic device 400 to directly enter or select the status information (e.g., a message).

Figure 6:
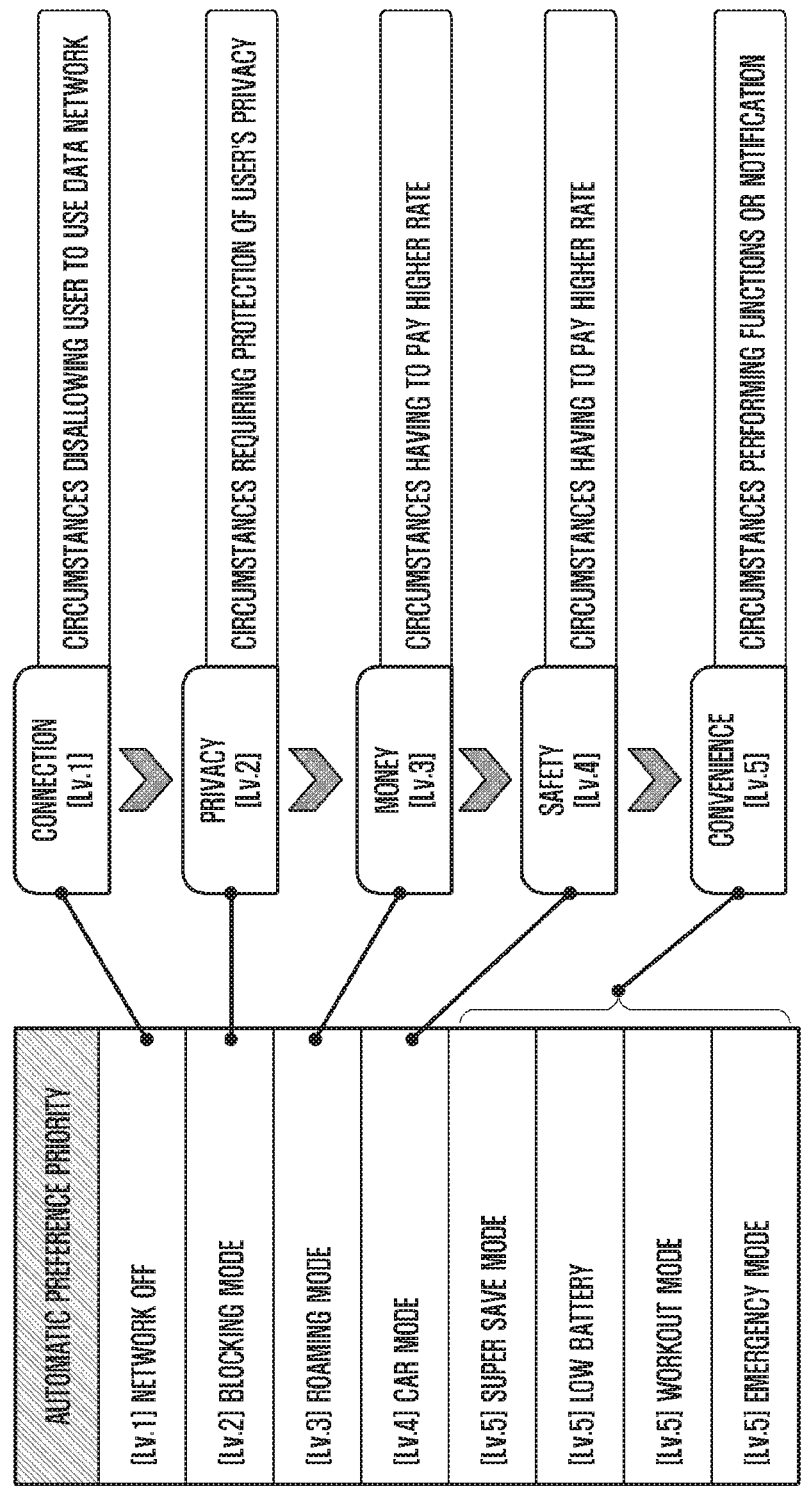
FIG. 6 is a diagram illustrating an example of priorities of status information applied to the present disclosure.

According to various embodiments, the status manager 420 may manage the status information of the electronic device 400 and, as shown in FIG. 6, create the status information of the electronic device 400 by adjusting or combining priorities of such status information. FIG. 6 is a diagram illustrating an example of priorities of status information applied to the present disclosure. As shown in FIG. 6, the priority of the status information of the electronic device 400 may include a network off, a blocking mode, a roaming mode, a car mode, a super save mode, a low battery, an exercising mode, an emergency mode, and the like.

According to various embodiments, the push & pull manager 430 may continuously transmit the status information of the electronic device 400 to the server 401 in a push manner, or continuously receive the status information of the external device 402 associated with a user of the electronic device 400 from the server 401 in a pull manner (e.g., polling).

Figure 7:
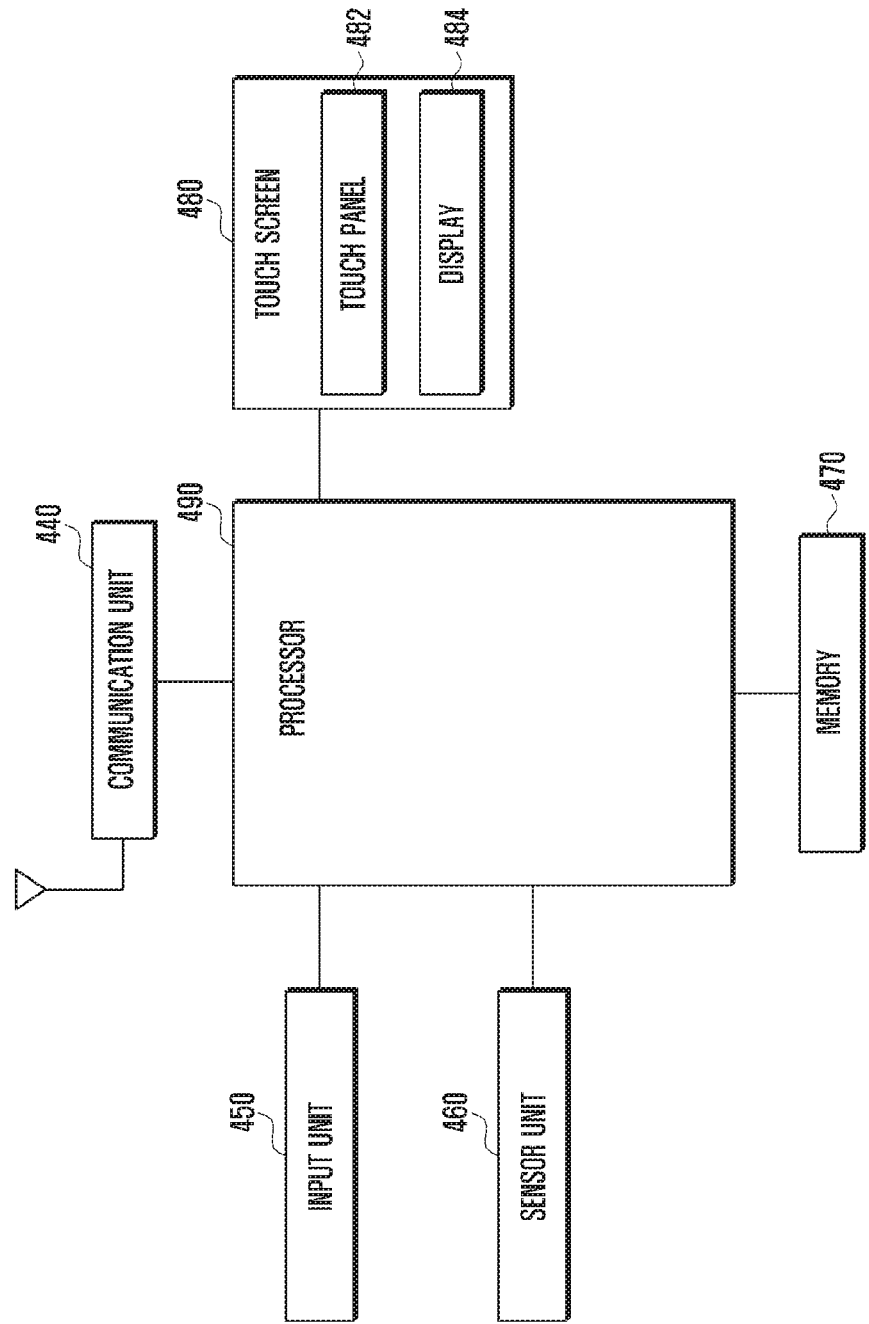
FIG. 7 is a block diagram illustrating a configuration of an electronic device applied to various embodiments of the present disclosure.

FIG. 7 is a block diagram illustrating a configuration of an electronic device applied to various embodiments of the present disclosure. The above-discussed electronic device 400 may further include the configuration shown in FIG. 7.

As shown in FIG. 7, the electronic device 400 may further include a wireless communication unit 440, an input unit 450, a sensor unit 460, a memory 470, a touch screen 480, and a processor 490.

According to various embodiments, the wireless communication unit 440 may perform a communication function of the electronic device 400. For example, the wireless communication unit 440 may establish a communication channel with a network and perform a communication function such as voice communication, video communication, and data communication with the external device 402. The wireless communication unit 440 may include various kinds of communication modules such as a mobile communication module for supporting at least one of 2G, 3G, 4G, and the like, a Wi-Fi module, and a short-range communication module. The wireless communication unit 440 may include a transmitter to up-convert the frequency of an outgoing signal and to amplify the up-converted signal, and a receiver to low-noise-amplify an incoming signal and to down-convert the frequency of the amplified signal. Additionally, the wireless communication unit 440 may receive data from a wireless channel and then deliver it to the processor 490, and transmit data outputted from the processor 490 to the external device 402 through the network.

The wireless communication unit 440 may perform a communication function for exchanging the status information with the server 401 and the external device 402.

According to various embodiments, the input unit 450 may create various input signals required for the operation of the electronic device 400. The input unit 450 may receive a user input for controlling a user setting and the electronic device 400, create a corresponding input signal, and deliver the signal to the processor 490. Then the processor 490 may control a particular function corresponding to the input signal. The input unit 450 may be formed of a keypad having alphanumeric keys and navigation keys, and also may include some function keys disposed on a housing of the electronic device 400.

The input unit 450 may select a specific item (or icon) of the status information of the external device 402.

According to various embodiments, the sensor unit 460 may include an acceleration sensor, a GPS sensor, a temperature/humidity sensor, an atmospheric pressure sensor, a motion recognition sensor, and a status information detection sensor. For example the acceleration sensor may detect the motion of a user of the electronic device 400 so as to determine whether the user is driving or not. The motion recognition sensor may be used to determine whether a user is sleeping or not, depending on whether there is no user's manipulation for a given time. The status information detection sensor may check functions of the electronic device 400 so as to detect roaming, a battery state, a Bluetooth connection, a Wi-Fi connection, and the like.

According to various embodiments, the memory 470 stores an operating system (OS), a program for processing and controlling of the processor 490, various applications, and input/output data. Also, the memory 470 may store a user interface (UI) offered by the electronic device 400 and various kinds of setting information required for the operation of the electronic device 400.

According to various embodiments, the memory 470 may store contact information (e.g., phone numbers) associated with the plurality of external devices 402 capable of communicating with the electronic device 400 through the wireless communication unit 440 and the network, and a plurality of items (e.g., a voice talk icon and a message icon) for indicating the status information. When executed, the processor 490 may combine and display the contact information and the status information items.

Specifically, the memory 470 may store instructions causing, when executed, the processor 490 to receive status information of a first external device among the plurality of external devices 402 from an external entity through the wireless communication unit 440, to retrieve at least part of the information about contacts stored in the memory 470, to display information about contact associated with the first external device on a first region 1301 of the display 484, based on the retrieved information, and to simultaneously display the received status information of the first external device near or within the first region 1301. The instructions may cause the processor 490 to display a user interface on a second region 1302 of the display 484 disposed near or overlapped with the first region 1301, based on the retrieved information. The user interface may arrange, in a scrollable form, the contacts associated with a plurality of external devices 402. The instructions may cause the processor 490 to receive an event (e.g., a missed call) related to the contact associated with the first external device through the wireless communication unit 440, and to display a notification on the second region 1302 in response to the received event. The first region 1301 may be disposed near or within the second region 1302. The second region 1302 of the display 484 may be adjacent to one edge of the display 484. In this case, the instructions may cause the processor 490 to display the first region 1301 in response to a gesture input (e.g., a touch-based scroll input) received through at least part of the second region 1302. The information about contacts associated with the plurality of external devices 402 may include at least one of a name, an ID, an email address, and a photo.

The instructions may cause the processor 490 to determine, based on at least part of the status information of the first external device, at least one communication manner for transmission of an event (e.g., a missed call) to the first external device, and to display a user interface associated with the determined at least one communication manner on the display 484. The at least one communication manner may include at least one of a telephone call, a video call, an SMS, an MMS, an instant messaging, an RCS messaging, a VoIP call, and a social network service (SNS). The instructions may cause the processor 490 to receive an event from the contact (e.g., phonebook) associated with the first external device in a first communication manner (e.g., a call), and to determine a second communication manner (e.g., a message) for transmission of an event to the contact associated with the first external device, based on the first communication manner and the status information of the first external device. The instructions may cause the processor 490 to display a user interface associated with the determined second communication manner on the display 484. The instructions may cause the processor 490 to execute an application associated with the determined second communication manner in response to a user input of selecting the user interface. The instructions may cause the processor 490 to display the first region 1301 on a lock screen.

According to various embodiments, the memory 470 may store instructions that cause, when executed, the processor 490 to display, on the display 484, a user interface including contact information of other user associated with the first external device in response to an input received through the display 484, to receive present or immediately previous status information of the first external device through the wireless communication unit 440, and to display an item (e.g., a call icon, a message icon, etc.) indicating the received status information as part of or near the contact information in the user interface.

According to various embodiments, the touch screen 480 may include a touch panel 482 and a display 484. The touch panel 482 may detect a user's touch input. The touch panel 482 may be formed of a touch sensor of capacitive overlay, resistive overlay, infrared beam, etc. or a pressure sensor. In addition to the sensor unit 460, any kind of sensor capable of detecting a user's touch or pressure may be used for the touch panel 482. The touch panel 482 may detect a user's touch input, create a detection signal, and send this signal to the processor 490. The detection signal may contain coordinates data of a user's touch input. If a user drags a touch point, the detection signal may include coordinates data of a drag path. In this disclosure, the touch panel 482 may deliver, to the processor 490, a signal created by a user's gesture, e.g., scroll, or a user's selection regarding a call or message. The display 484 may be formed of a liquid crystal display (LCD), an organic light emitting diodes (OLED), an active matrix OLED (AMOLED), and the like. The display 484 may visually offer, to a user, a menu, input data, function setting information, and any other type of information. Also, the display 484 may represent various kinds of information, such as status information and operating information, of the electronic device 400 and/or the external device 402. And also, the display 484 may represent user's gesture information and any graphical item such as a call icon or a message icon. As will be discussed below, the display 484 may have first and second regions for displaying the above. For example, the display 484 may output the status information of the electronic device 400 and/or external device 402 on a certain part thereof, e.g., an upper, lower, or middle region of a screen. The display 484 may perform a function of a user interface.

The above-discussed touch screen 480 may be not essential to the electronic device 400 and/or the external device 402. In a certain embodiment, the display 484 only may be used. In this case, the function of the touch panel 482 may be performed by the input unit 450 or the sensor unit 460.

According to various embodiments, the processor 490 may control the whole operation of the electronic device 400, control a signal flow between elements of the electronic device 400, and process data. For example, the processor 490 may be formed of a central processing unit (CPU), an application processor (AP), a communication processor (CP), and/or the like. The processor 490 may be formed of a single core processor or a multi-core processor.

In this disclosure, the processor 490 may control operations and signal flows of the respective elements of the electronic device 400, namely, the device monitor 410, the status manager 420, the push & pull manager 430, the wireless communication unit 440, the input unit 450, the sensor unit 460, the memory 470, and the touch screen 480. The processor 490 may control the display 484 to display status information received from the external device 402 on the first and second regions of the display 484, or control a particular corresponding function to be performed in response to a signal of selecting a specific item displayed on the first and second regions.

Specifically, the processor 490 may execute and control instructions to receive status information of a first external device among the plurality of external devices 402 from an external entity (e.g., the server 401) of the electronic device 400 through the wireless communication unit 440, to retrieve at least part of information about contacts associated with the external devices 402 and stored in the memory 470, to display information about contact associated with the first external device on a first region 1301 of the display 484, based on the retrieved information, and to simultaneously display the received status information of the first external device near or within the first region 1301.

Additionally, the processor 490 may execute and control instructions to display, on the display 484, a user interface including contact information (e.g., a phone number, etc.) of other user associated with the first external device in response to an input received through the display 484, to receive present or immediately previous status information of the first external device through the wireless communication unit 440, and to display an item indicating the received status information as part of or near the contact information in the user interface.

According to a digital convergence tendency today, the above-discussed elements of the electronic device 400 may be varied, modified and improved in various ways, and any other elements equivalent to the above elements may be additionally or alternatively equipped in the electronic device 400. As will be understood by those skilled in the art, some of the above-mentioned elements may be omitted or replaced with another. For example, the input unit 450 may include a touch screen, a key input unit, a touch pad, a trackball, and/or the like.

Figure 8:
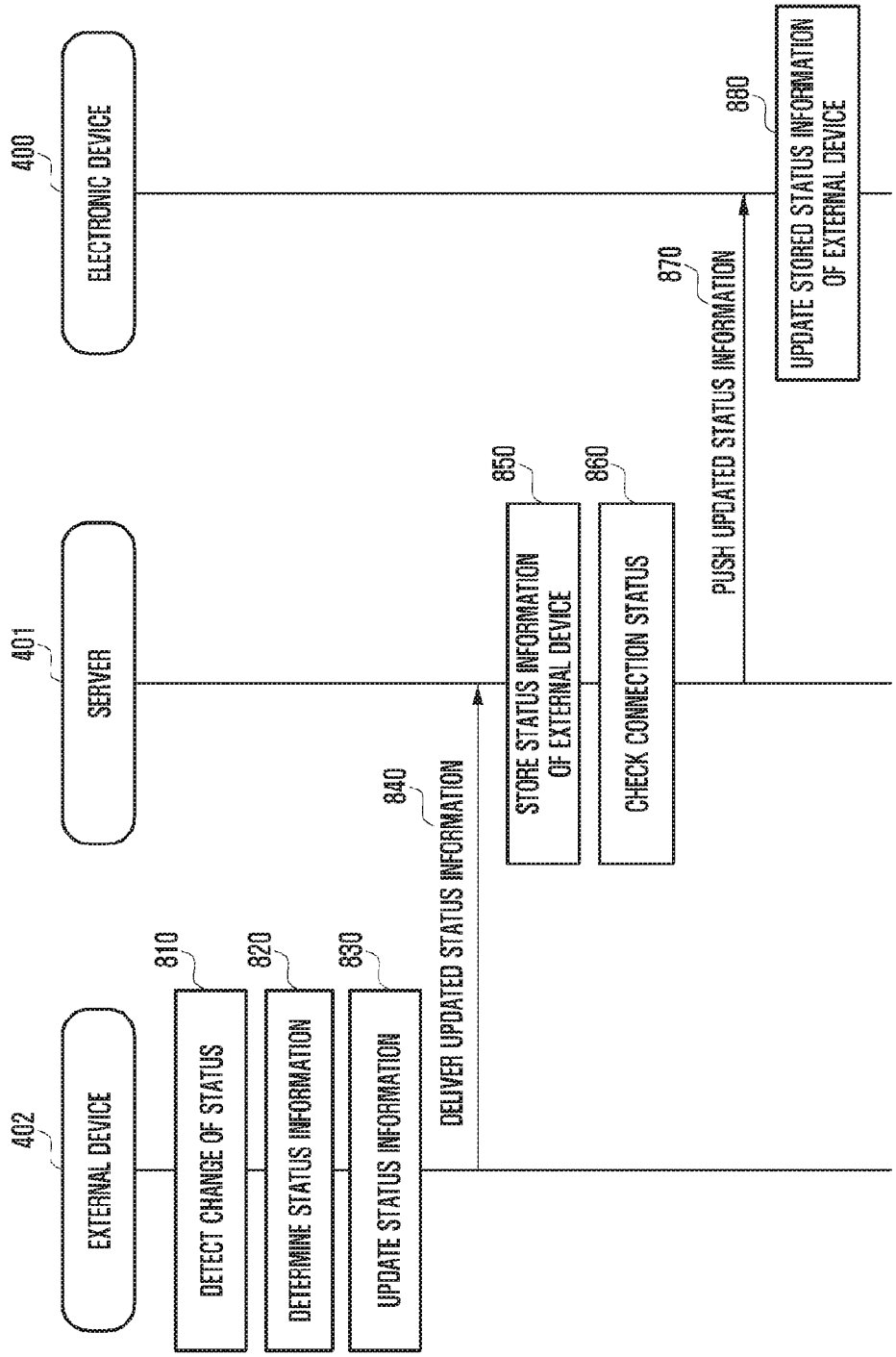
FIG. 8 is a flow diagram illustrating a process of receiving status information of an external device in a push manner at an electronic device according to various embodiments of the present disclosure.

FIG. 8 is a flow diagram illustrating a process of receiving status information of an external device in a push manner at an electronic device according to various embodiments of the present disclosure.

At the outset, the external device 402 may analyze a user's status thereof through the device monitor 410 and then create or update current status information. Specifically, when the status information of the external device 402 is changed, the device monitor 410 of the external device 402 may detect the changed status information at operation 810. Then the status manager 420 of the external device 402 may adjust or combine the priorities of the changed status information and determine the current status information of the external device 402 at operation 820. Thereafter, at operation 830, the status manager 420 may update the status information about an up-to-date status of the external device 402 by analyzing and combining the changed status information.

In this case, the priority of the changed status information may have a predetermined value such as a network off, a blocking mode, a roaming mode, a car mode, a super save mode, a low battery, an exercising mode, and an emergency mode, as shown in FIG. 6, and may also be varied depending on additional information of the electronic device 400 or external device 402. Namely, the priority may be changed depending on a change of user's status information. For example, if a user is driving, the determined priority may be changed to a car mode depending on the status information.

The external device 402 may transmit continuously the status information, updated at the operation 830, to the electronic device 400 through the push & pull manager 430 in a push manner at operation 840. In this case, the server 401 may store the updated status information at operation 850 and identify phone number information or a connection status of the external device 402 and the electronic device 400 at operation 860. Then, at operation 870, the server 401 may transmit the updated status information of the external device 402 to the electronic device 400 through the push module 409 in a push manner.

Thereafter, at operation 880, the electronic device 400 may change the stored status information of the external device 402 to the updated status information and then display it. Namely, whenever the status information of the external device 402 is updated, the electronic device 400 may receive the updated status information in a push manner. In this case, for allowing the electronic device 400 to receive user information of the external device 402 in a push manner, the server 401 may store both contact information of a user of the electronic device 400 and the status information of the external device 402 and also offer such stored information in real time in response to a request from the electronic device 400 or the external device 402.

Figure 9:
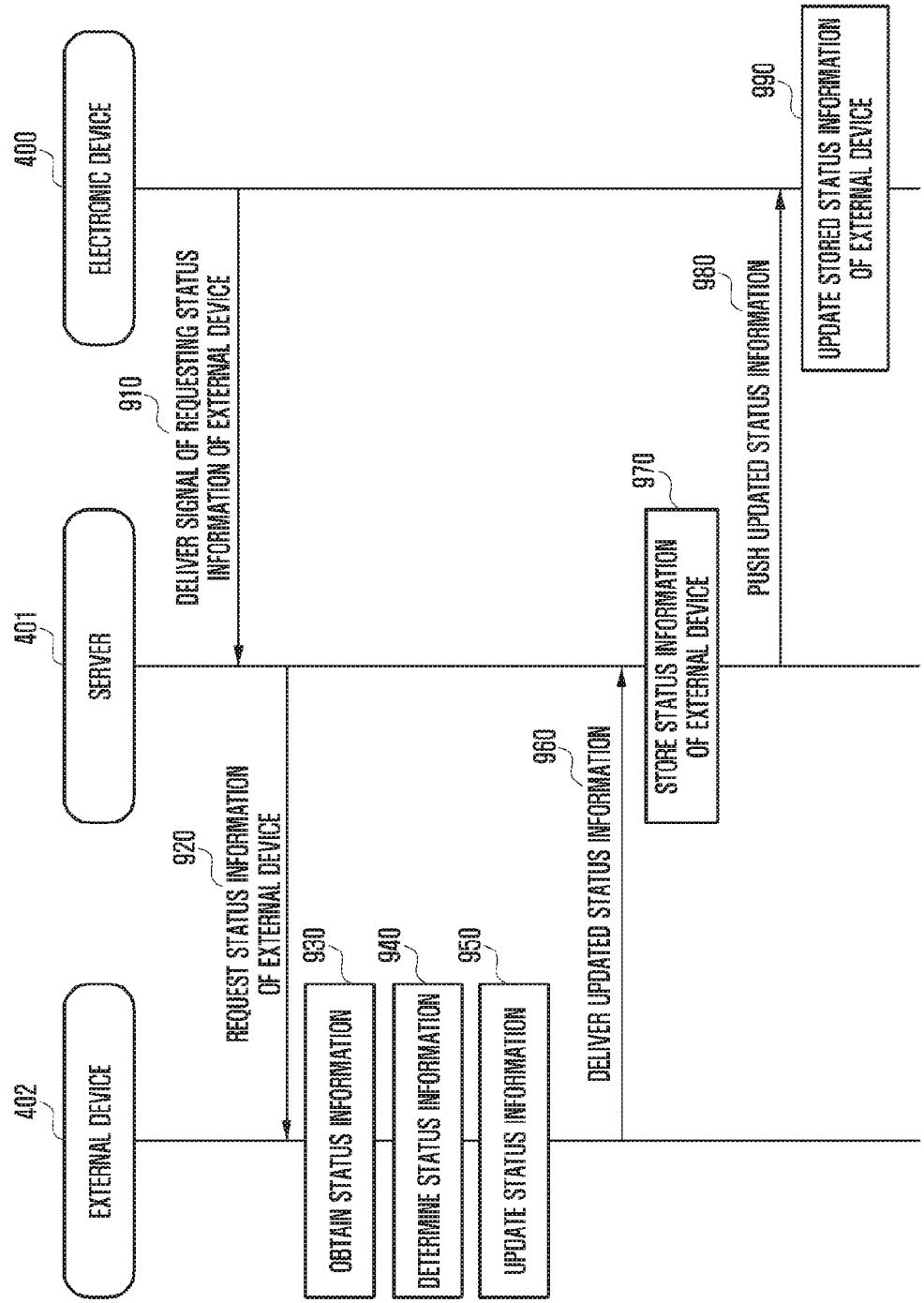
FIG. 9 is a flow diagram illustrating a process of receiving status information of an external device in a pull manner at an electronic device according to various embodiments of the present disclosure.

FIG. 9 is a flow diagram illustrating a process of receiving status information of an external device in a pull manner at an electronic device according to various embodiments of the present disclosure.

At the outset, the electronic device 400 may deliver a signal of requesting current status information of the external device 402 to the server 401 at operation 910. Then the server 401 that receives the requesting signal from the electronic device 400 may deliver the status information requesting signal of the electronic device 400 to the external device 402 at operation 920.

When the status information requesting signal is received, the external device 402 may obtain the status information of the external device 402 through the device monitor 410 at operation 930 and also determine current status information of the external device 402 through the status manager 420 at operation 940. Then, at operation 950, the external device 402 may update the up-to-date status information by analyzing and combining the status information thereof determined through the status manager 420.

Next, the external device 402 may deliver the status information, updated at the operation 950, to the electronic device 400 through the push & pull manager 430 in a pull manner at operation 960. At this time, the server 401 may store the updated status information of the external device 420 at operation 970 and then transmit the updated status information of the external device 402 to the electronic device 400 through the push module 409 in a push manner at operation 980.

The electronic device 400 may change the stored status information of the external device 402 to the updated status information and display it at operation 990. Namely, the electronic device 400 may request and receive the updated status information in a pull manner. When requesting the current status information of the external device 402 so as to display the status information of the external device 402 on the display 484, the electronic device 400 may receive only necessary status information about the external device 402 from the server 401.

Although the above-discussed FIGS. 8 and 9 show embodiments in which the electronic device receives the status information of the external device in a push or pull manner, this is exemplary only. Alternatively, the electronic device may receive the status information of the external device in any other manner without departing from the scope of the disclosure.

FIGS. 10A-10H are diagrams illustrating examples of status information of an external device received through the process shown in FIG. 8 or FIG. 9 and displayed on an electronic device according to various embodiments of the present disclosure. Specifically, in FIG. 10A, a screenshot is illustrated showing an example of basic information of the external device, and FIGS. 10B and 10C screenshots are illustrated showing examples of displaying the status information of the external device. Additionally, in FIGS. 10D-10H, screenshots are illustrated showing other examples of displaying the status information of the external device through a contact detail view, a contact list or call log, a call screen, a message screen, and a dialer screen, respectively.

Figure 10A:
FIGS. 10A-10H are diagrams illustrating examples of status information of an external device received through the process shown in FIG. 8 or FIG. 9 and displayed on an electronic device according to various embodiments of the present disclosure.

As shown in a screenshot illustrated in FIG. 10A, typical profile information (e.g., contact information of users recorded in a phonebook of the electronic device) of the external device 402 may be basic information that contains, for example, a name, a photo, a basic status, and the like. The basic information may include information about a name, a telephone number, an email, a website, an SNS account, a workplace, a residence, a current location, and the like. The photo information may contain a variety of photos selected as a user's profile or retrieved through an SNS service.

Figure 10B:
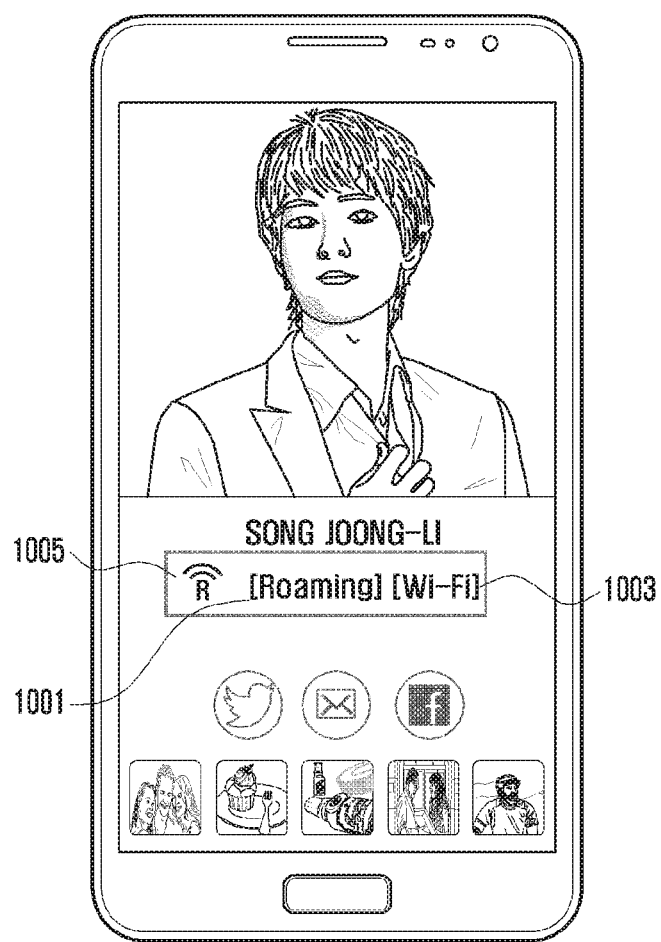
Figure 10C:
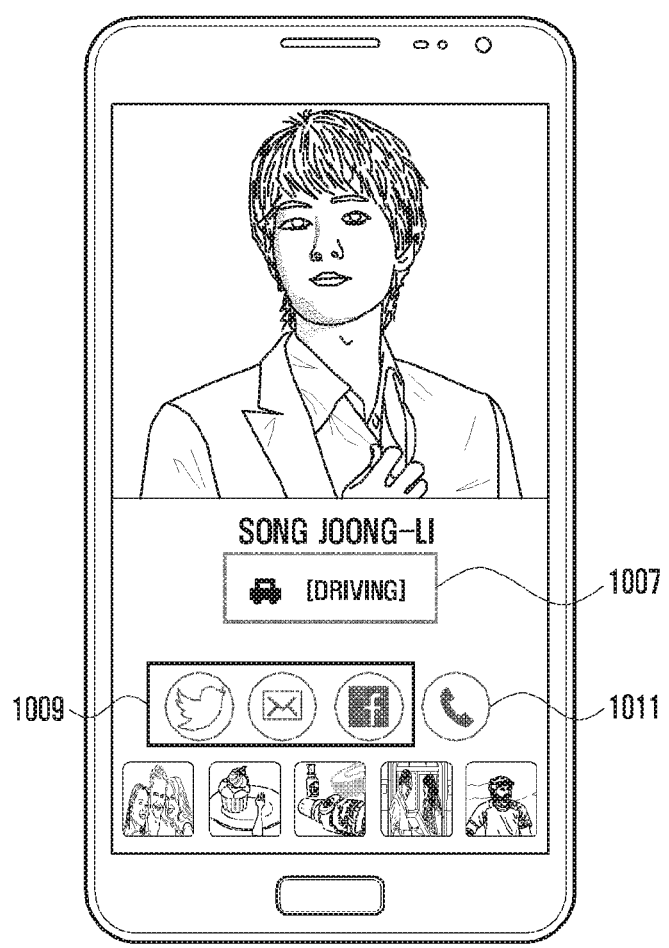
Figure 10D:
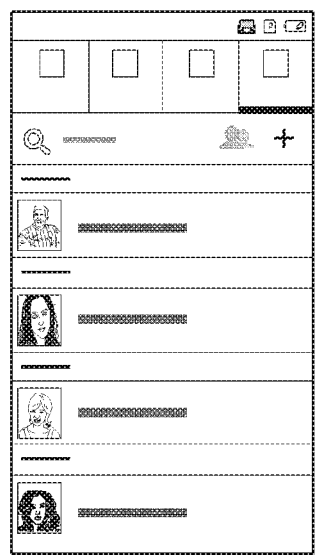
Figure 10E:
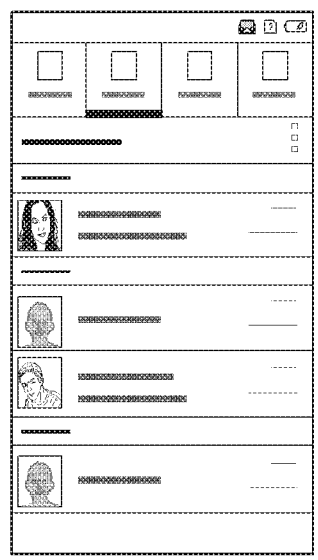
Figure 10F:
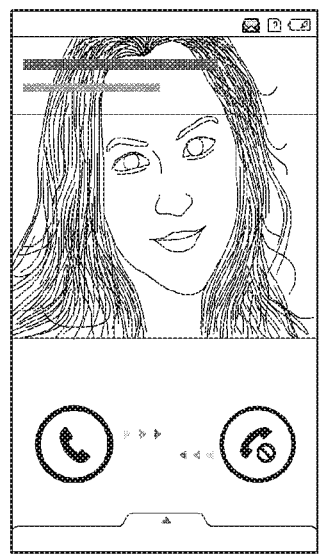
Figure 10G:
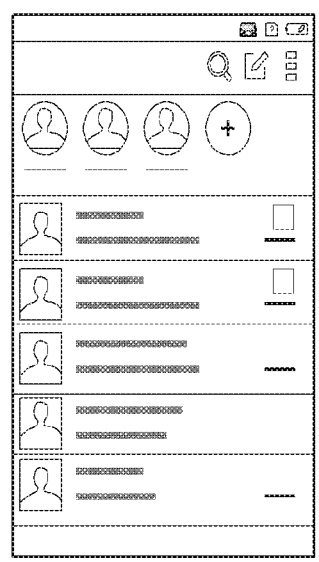
Figure 10H:
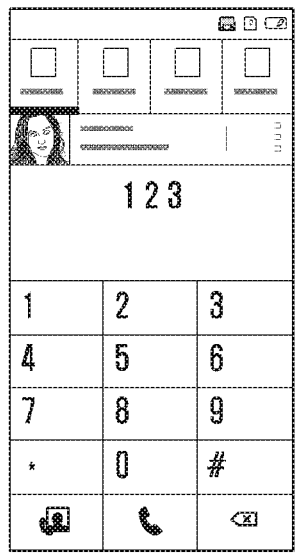

Meanwhile, if the status information of the external device 402 received through operations as shown in FIGS. 8 and 9 is applied to the profile information in this embodiment, the electronic device 400 may identify information about a current status of the external device 402 displayed on the display 484, such as roaming text 1001, Wi-Fi test 1003, roaming and Wi-Fi icons 1005, and driving text 1007 as shown in screenshots illustrated in FIGS. 10B and 10C. Depending on the status information of the external device 402, the electronic device 400 may dynamically change a displayed profile by recommending SNS and message icons 1009 or further recommending a call icon 1011. For example, if a user of the external device 402 is driving while the electronic device 400 displays roaming text 1001 and Wi-Fi text 1003 in accordance with the current status information of the external device 402 as shown in a screenshot illustrated in FIG. 10B, the electronic device 400 may further display the call icon 1011 together with driving text 1007 and a driving icon for indicating a driving status as shown in a screenshot illustrated in FIG. 10C. In this case, the recommended function may be changed in accordance with the priority as shown in FIG. 6.

In addition, as shown in screenshots illustrated in FIGS. 10D-10H, the electronic device 400 may also offer the status information of the external device 402 through a contact detail view, a contact list, a call log, a call screen, a message screen, a dialer screen, and the like.

For example, as shown in screenshots illustrated in FIGS. 10B and 10C, the status information may be displayed in the form of text, such as roaming text 1001, Wi-Fi text 1003, and driving text 1007, and/or in the form of icon, such as the roaming and Wi-Fi icon 1005, the SNS and message icons 1009, and the call icon 1011. The status information displayed on the display 484 may indicate one or more statuses or any combination thereof. The status information may have a text and/or binary form. Also, the status information may be encoded and decoded with information of the electronic device combined.

Figure 11:
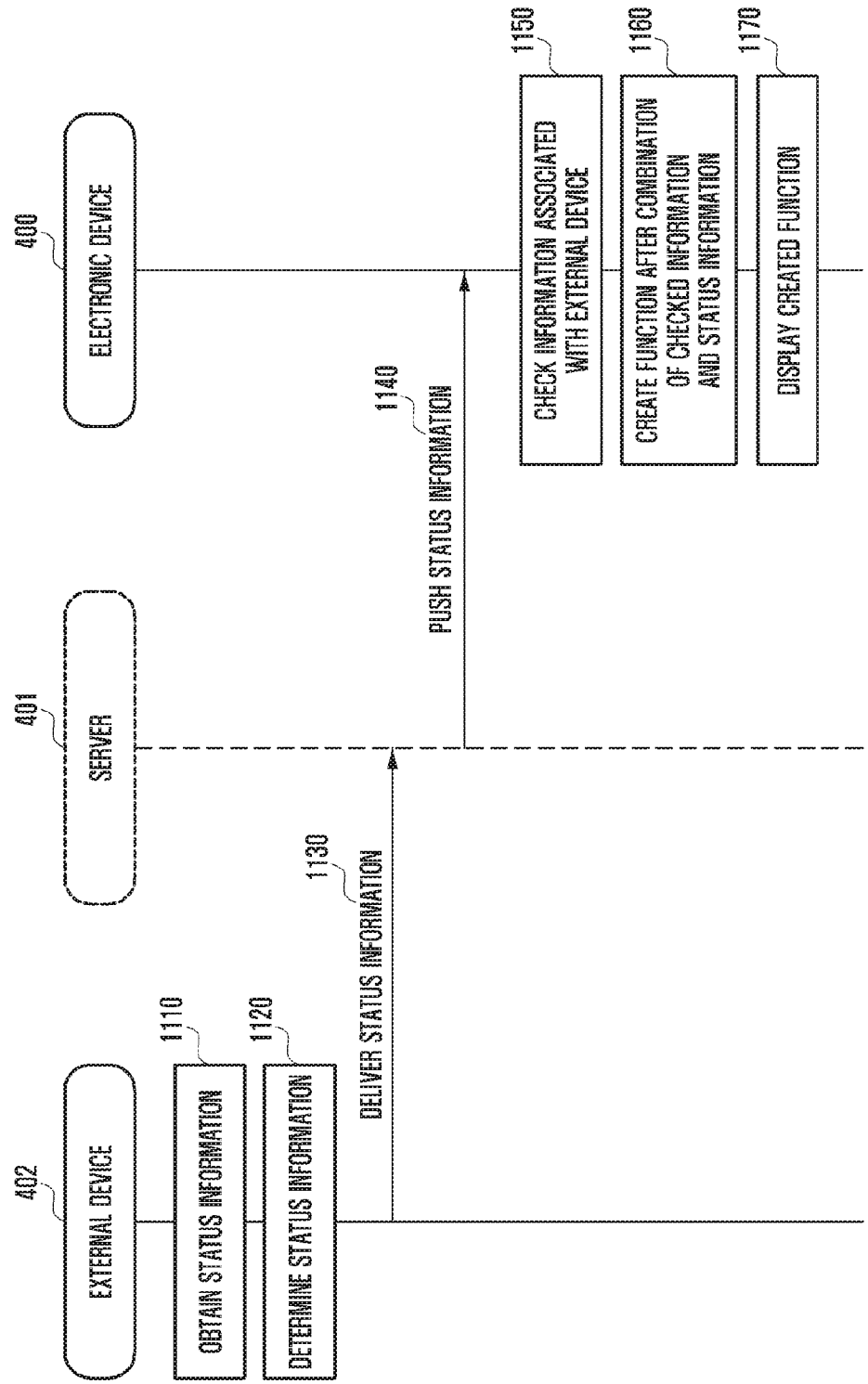
FIG. 11 is a flow diagram illustrating a process of changing and displaying status information of an external device according to various embodiments of the present disclosure.

FIG. 11 is a flow diagram illustrating a process of changing and displaying status information of an external device according to various embodiments of the present disclosure.

At the outset, the external device 402 may obtain status information thereof through the device monitor 410 at operation 1110 and then determine the status information thereof though the status manager 420 at operation 1120.

Next, the external device 402 may deliver the status information determined at operation 1120 to the electronic device 400 through the push & pull manager 430 in a push manner at operation 1130. Then the server 401 may transmit the status information, received from the external device 402, to the electronic device 400 through the push module 409 in a push manner at operation 1140.

Thereafter, the electronic device 400 may check information associated with the external device 402 at operation 1150, create a particular function by combining the checked information and the received status information of the external device 402 at operation 1280, and display the created function at operation 1290.

FIG. 12 shows a process of sending a request for current status information of the external device 402 to the server 401 or the external device 402 and then receiving the status information from the server 401 or the external device 402 when any information (e.g., a notification of missed call or a notification of message arrival) to be displayed on the display 484 of the electronic device 400 is associated with stored contact information of a user of the external device 402. Namely, by combining the status information obtained from the external device 402 or the server 401 with such information (e.g., a notification of missed call or a notification of message arrival) to be displayed, the electronic device 400 may determine a particular function (e.g., a message shortcut or a call shortcut) to be displayed and then display the determined function on the display 484. This status information request of the electronic device 40 may occur when there is a user's request having to display the stored status information of the external device 402 on the display 484. For example, in case of having to display a certain notification on a lock screen through a quick panel launching and a display on, the target of requesting information may be two or more external devices 402. Thus, depending on types of information to be displayed, the electronic device 400 may send the request for status information to two or more external devices 402.

Based on the above-discussed process shown in FIG. 11 or 12, the electronic device 400 may display the status information of the external device 402 on the display 484 in various manners. Although FIGS. 11 and 12 depict a delivery of the status information from the external device 402 to the electronic device 400 via the server 401, an alternative embodiment may allow the status information to be delivered from the external device 402 to the electronic device 400 directly without any intervention of the server 401.

FIGS. 13A-13E are diagrams illustrating examples of displaying status information of an external device on an electronic device according to various embodiments of the present disclosure. Specifically, in FIGS. 13A and 13B, screenshots are illustrated showing examples of displaying the status information of the external device on a lock screen of the electronic device.

If information to be displayed on the display 484 of the electronic device 400 is a certain notification such as "missed call" 1311 and "power off" 1312 or "message 1" 1313 and "driving" 1314 as shown in screenshots illustrated in FIGS. 10A and 10B, and if information of the external device 402 is stored in the memory 470 of the electronic device 400, the electronic device 400 may obtain the status information of the external device 402 through the server 401 in the process shown in FIG. 11 or 12, determine a particular function by combining the status information with stored user information, and then display the determined function.

Figure 13A:
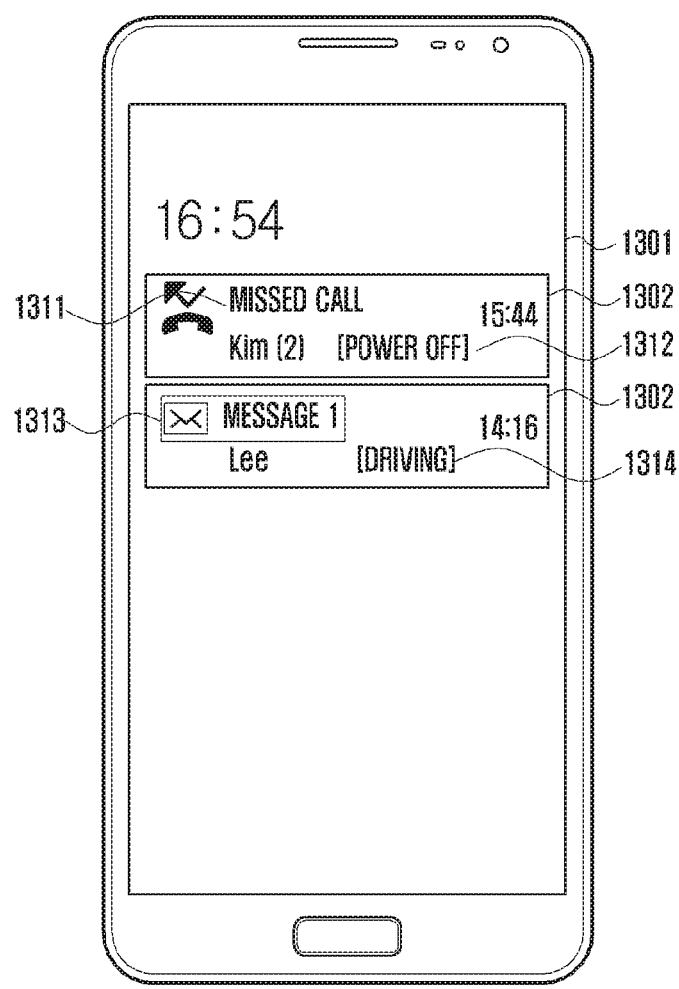
FIGS. 13A-13E are diagrams illustrating examples of displaying status information of an external device on an electronic device according to various embodiments of the present disclosure.
Figure 13B:
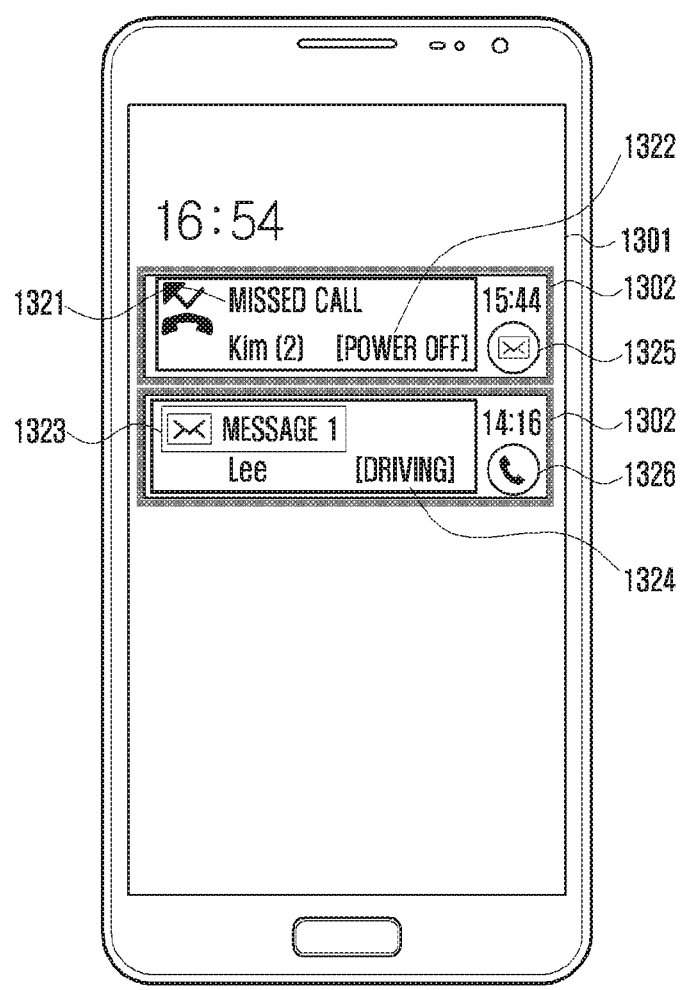

For example, as shown in a screenshot illustrated in FIG. 13B, if the status information obtained from the external device 402 is displayed as "power off" text 1312 on the first region 1301 of the display 484 of the electronic device 400, and also if any information associated with the external device 402 and stored in the electronic device 400 is displayed as "missed call" text 1321 on the first region 1301, this situation may indicate the unavailability of a call due to the power-off of the external device 402.

In this case, the processor 490 of the electronic device 400 may retrieve at least part of information about contacts (e.g., a phonebook) of the external device 402 stored in the memory 470. Then, based on the retrieved information, the processor 490 may display "missed call" text 1321 on the first region 1301 of the display 484 and also display a message icon 1325 on the second region 1302. Both displayed items may allow a delivery in an asynchronous manner. Additionally, the processor 490 may dial a call in response to a user's touch on the first region 1301 or display a new message page in response to a user's touch on the second region 1302.

In another example, as shown in a screenshot illustrated in FIG. 13B, if the status information of the external device 402 displayed on the first region 1301 is "driving" text 1324, the processor 490 may display a call icon 1326 for dialing a call rather than the message icon 1325 on the second region 1302 of the display 484.

In these cases, the message icon 1325 and the call icon 1326 displayed on the second region 1302 may be scrolled upward or downward in response to a user's touch and also allow a user's touch-based gesture input.

Figure 13C:
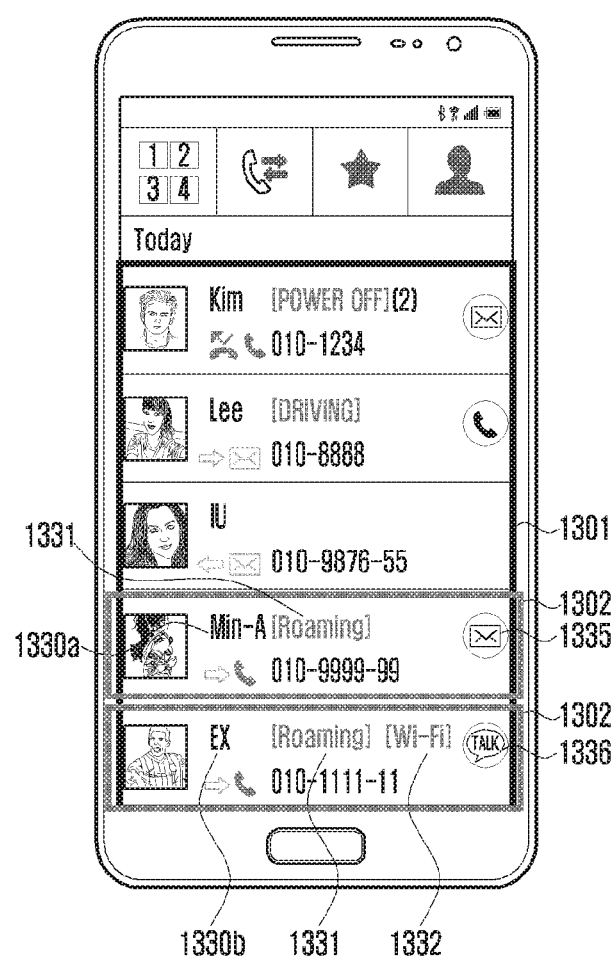
Figure 13D:
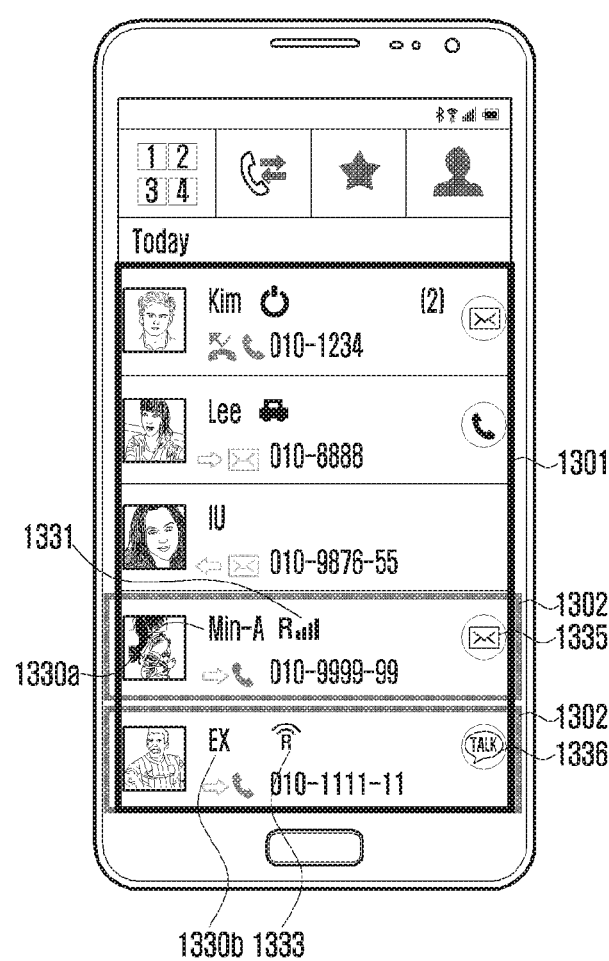
Figure 13E:
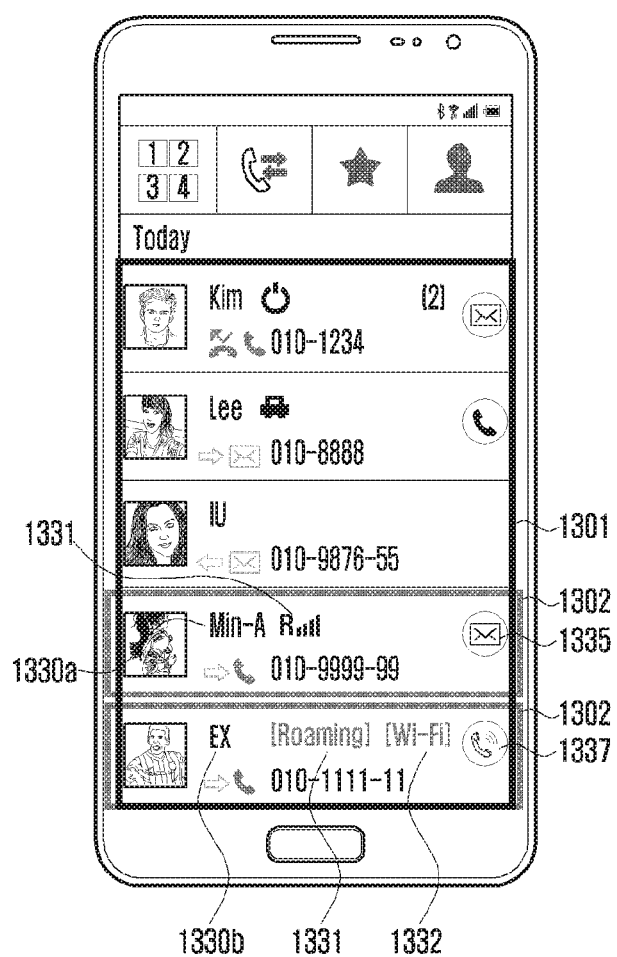

Meanwhile, screenshots illustrated in FIGS. 13C, 13D, and 13E show examples of displaying the status information of the external device on a call log page.

As shown in screenshots illustrated in FIGS. 13C and 13D, if two or more pieces of status information are received from two or more external devices 402, the first region 1301 may display different kinds of second information (e.g., Wi-Fi text 1332) (or display no second information) even though displaying the same kind of first information as text or icon 1331 (e.g., roaming text 1331).

For example, if there are received calls from the first user (e.g., Min-A) 1330a and the second user (e.g., EX) 1330b among the external devices 402, the first region 1301 may display text or icon 1331 for indicating a roaming status with regard to the first user 1330a and also display text 1331 and 1332 or icon 1333 for indicating a roaming and Wi-Fi status with regard to the second user 1330b. Namely, since the first information indicates the roaming status, it is desirable to display further information in addition to a dialing. For example, the second region 1302 of the display 484 may display a message application icon 1335 in case of the first user 1330a and also display a KakaoTalk application icon 1336, which is one of mobile messengers, in case of the second user 1330b. In this case, the second region 1302 of the display 484 may be disposed near or overlapped with the first region 1301. More specifically, if information of the external device 402 stored in the electronic device 400 is "missed call", and if a Wi-Fi connection with the second user 1330b is possible, a connection using a mobile messenger (e.g., KakaoTalk application) may be available. Therefore, the electronic device 400 may combine the status information of the external device 402 with the KakaoTalk icon 1336. In this case, if a user of the electronic device 400 touches the KakaoTalk icon 1336, a chat window of the KakaoTalk application may be displayed. According to various embodiments, the specific application icon (e.g., the KakaoTalk icon 1336) may indicate a further function (e.g., VoIP call, etc.) available in the corresponding application (e.g., the KakaoTalk application). According to various embodiments, such related functions (e.g., VoIP call, etc.) available in a specific application (e.g., the KakaoTalk application) may be displayed directly on the screen.

A screenshot illustrated by FIG. 13E shows this example. According to various embodiments, if there is a missed call from the second user 1330b, the electronic device 400 may find a particular function (e.g., a VoIP call function) associated with the missed call, based on the current status information. Then the electronic device 400 may display a VoIP call icon 1337 on the screen and connect a VoIP Call through this icon 1337. In another example, if the Wi-Fi text or icon 1332 or 1333 of the external device 402 is displayed, the availability of an SNS service with the external device 402 through the Wi-Fi network may be further displayed.

Figure 20A:
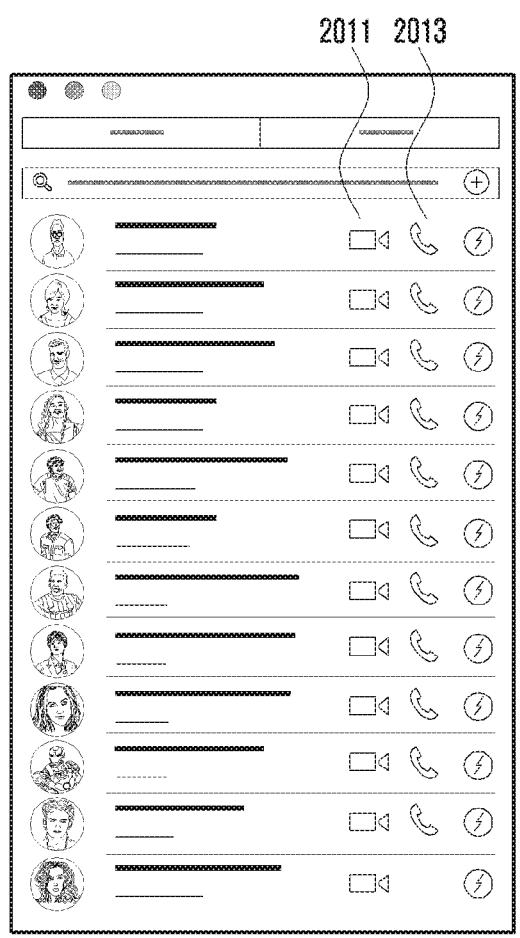
FIGS. 20A and 20B are diagrams illustrating examples of a direct communication between an electronic device and an external device according to various embodiments of the disclosure.
Figure 20B:
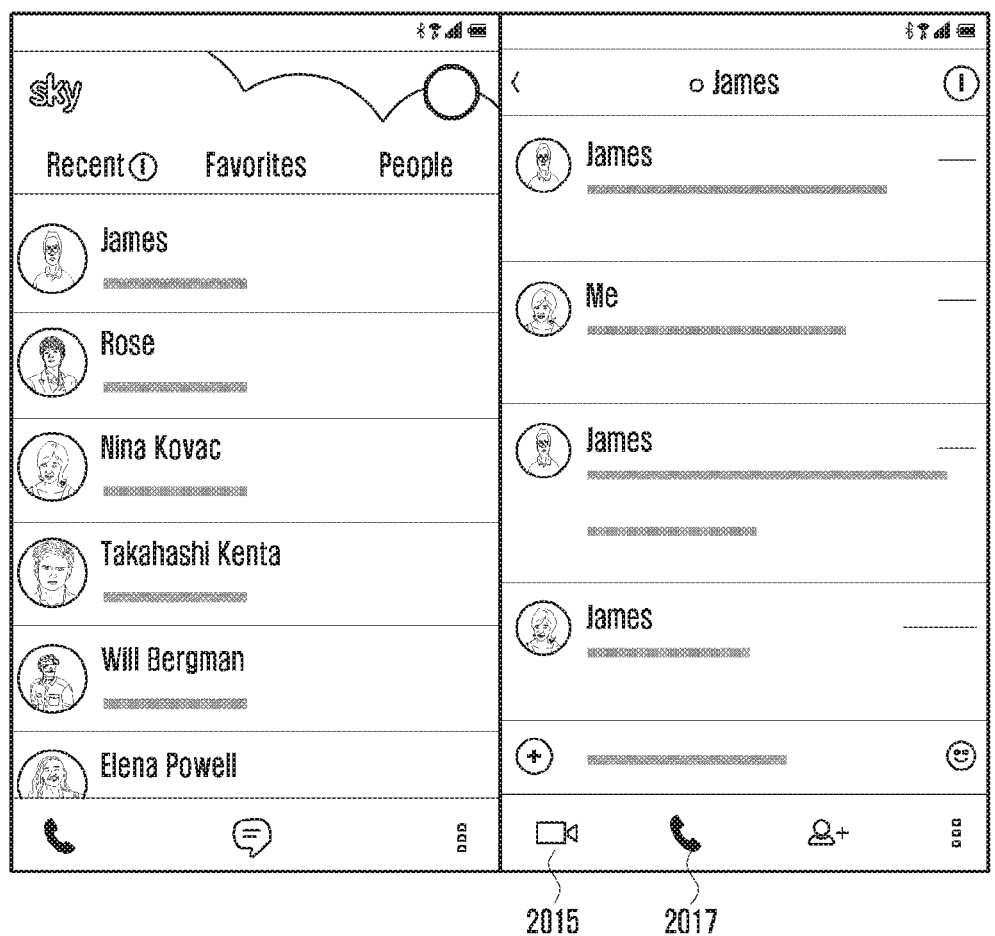

Although the electronic device 400 shares status information with the external device 402 through the server 401 in the above-discussed embodiments, such status information may be managed by an application itself as shown in screenshots illustrated in FIGS. 20A and 20B, not by the server. For example, in case of a video chatting application (e.g., Facetime, Skype, etc.), the device status information management may be implemented in a corresponding application itself. FIGS. 20A and 20B show an example of managing the device status information of the other party (i.e., the external device) at the corresponding application itself. Specifically, FIG. 20A illustrates a screenshot showing an example in which the electronic device 400 and the external device 402 may communicate directly with each other through a video talk icon 2011 and a call dial icon 2013 in a certain video chatting application. Additionally, FIG. 20B illustrates a screenshot showing another example in which the electronic device 400 and the external device 402 may communicate directly through a video call icon 2015 and a call dial icon 2017.

Meanwhile, during a real call between the electronic device 400 and the external device 402, any information about a currently running interface of the external device 402 can be delivered in real time. For example, while a call connection is made between the electronic device 400 and the external device 402, it is possible to know whether the external device 402 uses a normal device, a wearable device (e.g., Samsung Gear Circle™) or watch-type device connected thereto, or a sound device (e.g., speakerphone) connected thereto. Such status information of the external device 402 may be also delivered to the electronic device 400. Furthermore, environment information such as a location of the external device 402, a low battery state, and/or surrounding noise may be offered to the electronic device 400.

Figure 14:
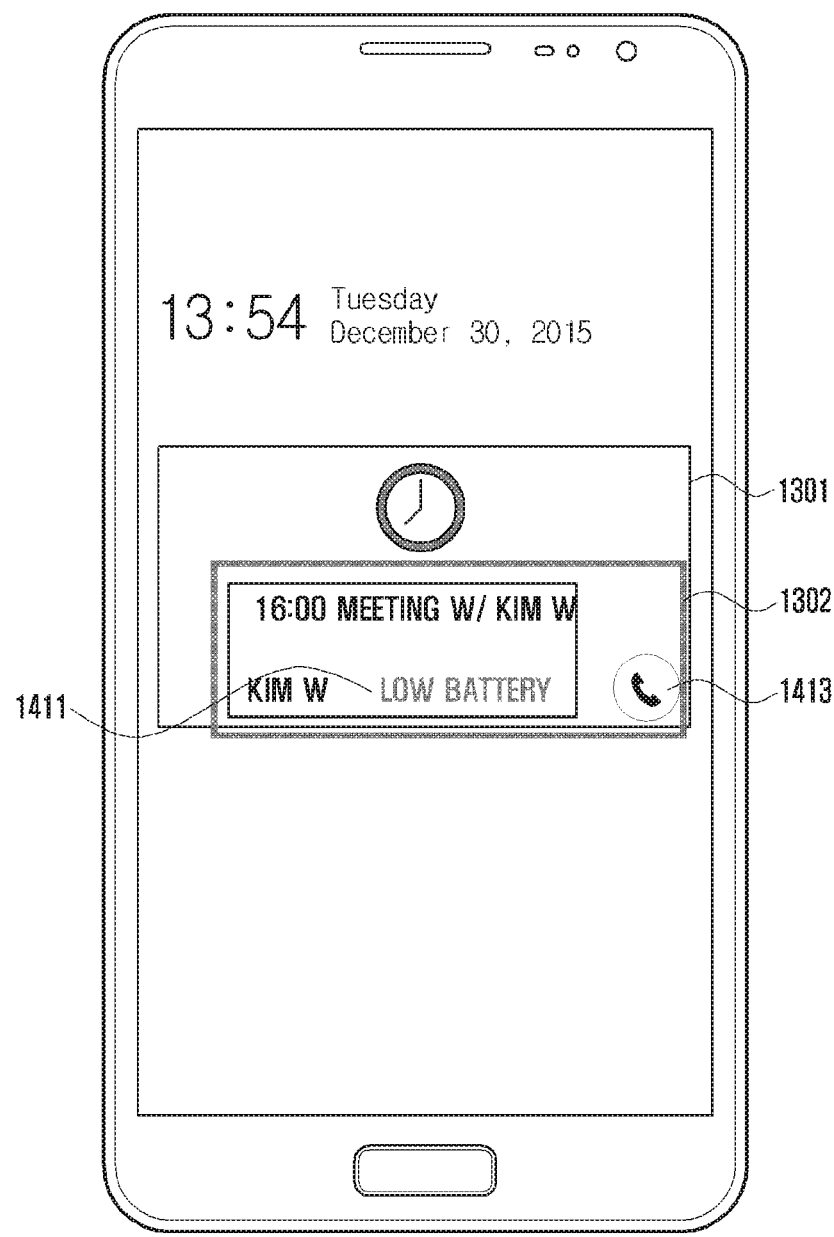
FIG. 14 is a diagram illustrating an example of updating changed information delivered from an external device in a push manner at an electronic device according to various embodiments of the present disclosure.

FIG. 14 is a diagram illustrating an example of updating changed information delivered from an external device in a push manner at an electronic device according to various embodiments of the present disclosure.

If the status information delivered in a push manner from the external device 402 or the server 401 is updated, the electronic device 400 may check user information associated with the external device 402 and stored therein, combine the check information with the updated status information, determine a particular function for a user thereof, and display the determined function on the first region 1301 of the display 484 as discussed earlier in FIG. 11.

Referring to FIG. 14, when the status information of the external device 402 is updated, the external device 402 may deliver the updated status information to the electronic device 400 in a push manner. For example, the electronic device 400 may receive and display the updated status information 1411, "low battery", on the first region 1301 of the display 484. In this case, the electronic device 400 may combine schedule information, associated with the external device 402 and stored therein, with the updated status information and then display, as a particular function icon, a call icon 1413 on the second region 1302 of the display 484 so as to recommend a user to call with the external device 402 before the power-off.

Figure 15:
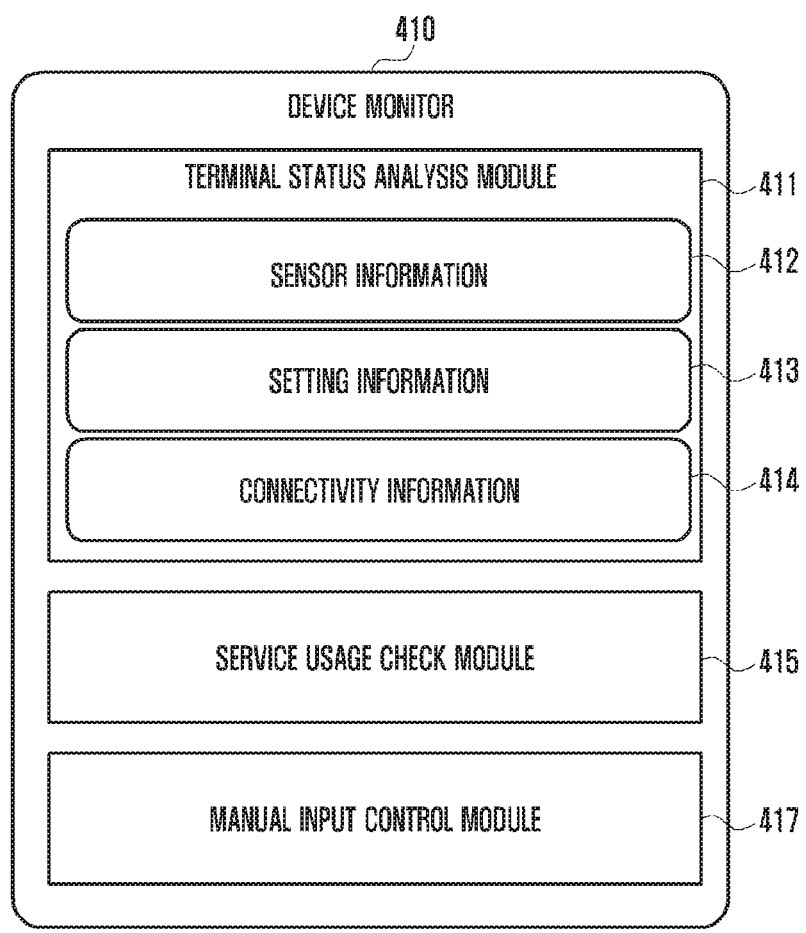
FIG. 15 is a diagram illustrating an example of analyzing status information of an electronic device through connectivity information according to various embodiments of the present disclosure.

FIG. 15 is a diagram illustrating an example of analyzing status information of an electronic device through connectivity information according to various embodiments of the present disclosure.

According to various embodiments, the terminal status analysis module 411 embedded in the electronic device 400 or external device 402 may analyze automatically the status information of the electronic device 400 or external device 402, including sensor information 412 (e.g., acceleration, temperature, humidity, atmospheric pressure, etc.) and setting information 413 (e.g., roaming, a battery state, a Bluetooth connection, a Wi-Fi connection, etc.) as shown in FIG. 15. In addition, the terminal status analysis module 411 may also analyze and utilize the status information of the electronic device 400 or external device 402, further including connectivity information 414 that indicates whether any interacting device such as a watch-type device, an IPTV, and an agent robot is connected.

FIG. 16 is a diagram illustrating an example of displaying status information of an interacting device such as a wearable device through connectivity information according to various embodiments of the present disclosure.

As shown in FIG. 16, if information to be displayed on the display 484 of the electronic device 400 is a call log, this call log may be associated with user information of the external device 402 stored in the electronic device 400. The server 401 may obtain the status information from the external device 402 and deliver the obtained status information to the electronic device 400. Then the electronic device 400 may combine the status information of the external device 402 with the stored user information and also display this combined information about the external device 402 on the display 484. For example, if the status information of the external device 402 displayed on the first region 1301 of the electronic device 400 is "workout" text 1611, the electronic device 400 may determine that the external device 402 is placed in a situation incapable of receiving a call, and thereby display a message icon 1612, rather than a call icon 1615, on the second region 1302. However, if the connectivity information 414 of the electronic device 400 indicates that the external device 402 is connected with a wearable device 1602, the electronic device 400 may determine that the external device 402 is placed in a situation capable of receiving a call through the wearable device 1602, and thereby display a call icon 1615 together with an indication "wearable" text 1613 near another indication "workout" text 1611 on the first region 1301 of the display 484. For example, if a watch-type device is connected with the external device 402, the electronic device 400 may display an indication "video call". It is understood that text indications and icon indications may be interchangeable. Also, if the external device 402 is a wearable device, the electronic device 400 may determine whether the wearable device is a watch-type device having a display or a Samsung Gear Circle™ having voice supportability with no display, and then display this information.

Namely, the electronic device 400 and the external device 402 exchange information about capability of an interacting device through the connectivity information 414 and thereby deliver content to the interacting device in the most suitable (or effective) form. For example, the wearable device 1602 such as a watch-type device connected with the external device 402 supports a smaller-sized screen and thus can merely display about ten letters on the screen in case of SMS. By the way, a user of the electronic device 400 may often send a message exceeding ten letters because the user cannot know the screen size of the wearable device 1602. Therefore, in case of desiring to send a message of, e.g., thirty or more letters, the processor 490 of the electronic device 400 may send three or more messages each having ten letters by combining the status information of the external device 402 (e.g., workout), the connectivity information (e.g., a wearable connection), and the capability information of the interacting device.

FIG. 17 is a diagram illustrating an example of displaying status information of an interacting device such as a smart TV according to various embodiments of the present disclosure.

As shown in FIG. 17, when an interacting device such as a smart TV 1702 is connected with the external device 402, the electronic device 400 may display contents through the smart TV 1702 instead of the external device 402. In this case, the electronic device 400 may provide contents suitable for the resolution of the smart TV 1702 by combining the status information of the external device 402 with additional capability information of the smart TV 1702. The smart TV 1702 is a display device adapted for multimedia and thus may provide a user interface suitable for multimedia transmission to a user. For example, the electronic device 400 may provide optimal contents to the external device 402 and the interacting device (e.g., smart TV) by combining the status information of the external device 402 with the connectivity information.

Figure 18:
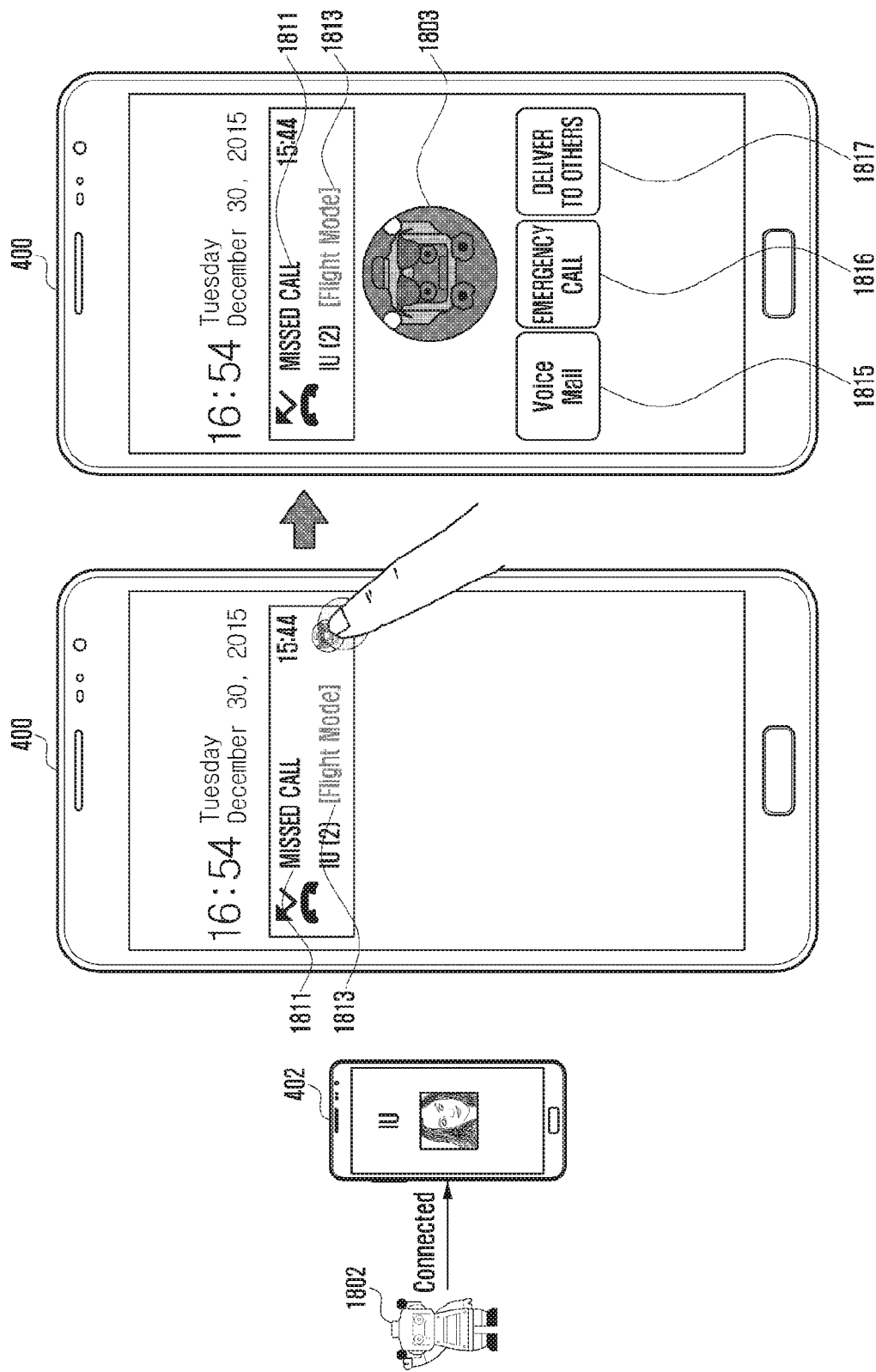
FIG. 18 is a diagram illustrating an example of displaying status information of an interacting device such as a robot according to various embodiments of the present disclosure.

FIG. 18 is a diagram illustrating an example of displaying status information of an interacting device such as a robot according to various embodiments of the present disclosure.

As shown in FIG. 18, if the interacting device connected with the external device 402 is a robot 1802 (i.e., an electronic device having an agent function), the external device 402 may store or deliver a message received from the electronic device 400 through the robot 1802 even though the external device 402 is placed in a status incapable of a call connection, such as in a flight mode, in a power-off mode, at meeting, or in a car mode. For example, there is a missed call indication text 1811 from a certain user whose information has been already stored (e.g., contact information), the electronic device 400 may deliver data, contents, a user interface, etc. to the external device 402 through the robot 1802 even though the status information of the external device 402 indicates a flight mode (as indicated by, e.g., flight mode text 1813), for example. Namely, the robot 1802 connected with the external device 402 may store a voice mail received from the electronic device 400 and then deliver the stored voice mail in response to a user's touch on a voice mail icon 1815. Also, this voice mail may be delivered to the external device 402 through the third party.

When the robot 1802 is used as an interacting device of the external device 402 as shown in FIG. 18, the electronic device 400 may display, on the display 484, a user interface such as a voice mail icon 1815, an emergency call icon 1816, and a deliver to others icon 1817, together with a robot icon 1803. In addition, the electronic device 400 may provide an environment capable of exchanging data in a voice manner through the robot 1802. For example, when a user of the electronic device 400 selects the robot icon 1803 in case there is a missed call from a user of the external device 402, the electronic device 400 may be connected with the robot 1802 by means of voice and deliver a user's command and message through voice. For example, if a user of the electronic device 400 delivers a voice such as "I didn't receive your call because I left my phone. I'm going to the airport at your arrival time. Leave me a voice message." to the robot 1802, the robot 1802 may distinguish a command "Leave me a voice message." from a message "I didn't receive your call because I left my phone. I'm going to the airport at your arrival time." and thereby perform the command. This command may be a voice message or any other typed message. Also, if a user of the electronic device 400 leaves a voice message "Let me know as soon as you arrive." to the robot 1802, and then if a user of the external device 402 approaches the robot 1802, the robot 1802 may deliver this message to the user of the external device 402. Also, if a user of the electronic device 400 leaves a voice message "Let me know if any one comes.", the robot 1802 may send this message to any approaching person other than the user of the external device 402 such that this person can deliver the message to the user of the external device 402. The voice exchange between the electronic device 400 and the robot 1802 may be performed through a phone call. Additionally, such a message may be received through a voice response of the robot icon 1803 displayed on the user interface of the electronic device 400. The exchange with the robot may be varied depending on a setting mode of the electronic device 400 or external device 402. For example, a graphical user interface may be displayed on the display 484 when the electronic device 400 is in a vibration mode, and a voice sensitive interface may be activated when the electronic device 400 is in a sound mode.

According to various embodiments, the above-discussed embodiment shown in FIG. 13B may be applied to FIGS. 16 to 18.

FIG. 19 is a diagram illustrating status information of an external device indicating an emergency case according to various embodiments of the present disclosure.

The electronic device 400 may check whether a user of the external device 402 is placed in an emergency state, through a combination of interacting devices such as various sensors or a wearable devices even though the status information of the external device 402 does not indicate a low battery or roaming. In this case, as shown in FIG. 19, certain information indicating that a user of the external device 402 is in an emergency state may be delivered to neighboring users. Then the electronic device 400 receiving such information may change the status of this user to an emergency status and also display a related notification on the display 484. For example, when a user of the external device 402 is in an emergency state, the electronic device 400 may display, on the display 484, emergency mode text 1911, a call icon 1913, and an emergency call icon 1915. Further, the electronic device 400 may trigger a camera of the external device 402 so as to enable a user thereof to obtain information about a current situation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a communication circuit;
a display;
at least one processor; and
a memory,
wherein the memory stores information about contacts associated with a plurality of external devices capable of communicating with the electronic device, and
wherein the memory stores instructions that, when executed, cause the at least one processor to:
receive status information of a first external device of the plurality of external devices through the communication circuit,
retrieve at least part of the information about the contacts stored in the memory to generate retrieved information,
display information about a contact associated with the first external device on a first region of the display, based on the retrieved information,
display the received status information of the first external device near or within the first region,
if a user information of the first external device is not stored, store the received status information of the first external device, and
if the status information is updated status information, display the stored status information and the updated status information on the display.

2. The electronic device of claim 1, wherein the instructions further cause the at least one processor to:
display a user interface on a second region of the display disposed near or overlapped with the first region, based on the retrieved information,
wherein the user interface displays, in a scrollable form, the contacts associated with a plurality of external devices.

3. The electronic device of claim 2, wherein the instructions further cause the at least one processor to:
receive an event related to the contact associated with the first external device through the communication circuit, and
display a notification on the second region in response to the received event,
wherein the first region is disposed near or within the second region.

4. The electronic device of claim 3, wherein:
the second region of the display is adjacent to one edge of the display, and
the instructions cause the at least one processor to display the first region in response to a gesture input received through at least part of the second region.

5. The electronic device of claim 1, wherein the information about contacts associated with the plurality of external devices includes at least one of a name, an ID, an email address, and a photo.

6. The electronic device of claim 1, wherein the instructions further cause the at least one processor to:
determine, based on at least part of the status information of the first external device, at least one communication manner for transmission of an event to the first external device, and
display a user interface associated with the at least one communication manner on the display.

7. The electronic device of claim 6, wherein the at least one communication manner includes at least one of a telephone call, a video call, an SMS, an MMS, an instant messaging, an RCS messaging, a VoIP call, and a social network service (SNS).

8. The electronic device of claim 1, wherein the instructions further cause the at least one processor to:
receive an event from the contact associated with the first external device in a first communication manner, and
determine a second communication manner for transmission of an event to the contact associated with the first external device, based on the first communication manner and the status information of the first external device.

9. The electronic device of claim 8, wherein the instructions further cause the at least one processor to display a user interface associated with the second communication manner on the display.

10. The electronic device of claim 9, wherein the instructions further cause the at least one processor to execute an application associated with the second communication manner in response to a user input of selecting the user interface.

11. The electronic device of claim 1, wherein the instructions further cause the at least one processor to display the first region on a lock screen.

12. A method for providing information at an electronic device, the method comprising operations of:
receiving status information of an external device to generate received status information of the external device;
checking stored user information of the external device;
displaying, on a first region of a display, particular information created by combining the received status information with the stored user information;
if the user information of the external device is not stored, storing the received status information of the external device; and
if the status information is updated status information, displaying the stored status information and the updated status information on the display.

13. The method of claim 12, further comprising operation of:
transmitting a request for current status information of the external device to the external device.

14. The method of claim 13, further comprising operations of:
after transmitting the request, receiving the current status information from the external device; and
displaying the received current status information on a second region of the display.

15. The method of claim 12, wherein the received status information of the external device contains information about an interacting device connected with the external device.

16. The method of claim 15, wherein the interacting device includes at least one of a wearable device, a watch-type device, a smart TV, and a robot.

* * * * *